US009915179B2

(12) United States Patent
Christensen

(10) Patent No.: US 9,915,179 B2
(45) Date of Patent: *Mar. 13, 2018

(54) TRANSIENT LIQUID PRESSURE POWER GENERATION SYSTEMS AND ASSOCIATED DEVICES AND METHODS

(71) Applicant: Ronald Kurt Christensen, Highland, UT (US)

(72) Inventor: Ronald Kurt Christensen, Highland, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/842,489

(22) Filed: Mar. 15, 2013

(65) Prior Publication Data

US 2013/0340433 A1    Dec. 26, 2013

Related U.S. Application Data

(63) Continuation-in-part of application No. 12/928,663, filed on Dec. 16, 2010, now abandoned.
(Continued)

(51) Int. Cl.
*F03G 7/00* (2006.01)
*F03G 7/10* (2006.01)
(Continued)

(52) U.S. Cl.
CPC ............ *F01K 27/005* (2013.01); *F03B 13/00* (2013.01); *F03B 17/04* (2013.01); *F03B 17/06* (2013.01); *F03G 7/00* (2013.01); *F03G 7/10* (2013.01); *F05B 2220/602* (2013.01); *Y02B 10/50* (2013.01)

(58) Field of Classification Search
CPC .................... F03B 13/00; F03B 13/06; F03B 17/00–17/068; F03G 7/00; F03G 3/00; F03G 7/04; F03G 7/10; Y02E 10/22; Y02E 60/17; Y02E 10/28; Y02E 10/38;
(Continued)

(56) References Cited

U.S. PATENT DOCUMENTS 2,962,599 A    11/1960   Pirkey
3,133,591 A *   5/1964   Brandon .................. B01J 19/10
                                                        116/DIG. 22
(Continued)

FOREIGN PATENT DOCUMENTS

DE    10317680 A1 * 10/2004   ............. F03B 17/00
EP     2302202 A1    3/2011
(Continued)

*Primary Examiner* — Laert Dounis
(74) *Attorney, Agent, or Firm* — Thorpe North and Western, LLP; David W. Osborne

(57) ABSTRACT

A transient liquid pressure power generation system and associated devices and methods is disclosed. The system can include a liquid source and a transient pressure drive device fluidly coupled to the liquid source to receive liquid from the liquid source. The transient pressure drive device can include a drive component, and a transient wave or pressure producing element to cause a high pressure transient wave in the liquid traveling toward the liquid source to operate the drive component. Additionally, the system can include a heat source fluidly coupled to the transient pressure drive device and the liquid source to receive liquid from the transient pressure drive device and heat liquid returning to the liquid source.

23 Claims, 9 Drawing Sheets

Related U.S. Application Data

(60) Provisional application No. 61/284,632, filed on Dec. 21, 2009.

(51) Int. Cl.
*F03B 13/00* (2006.01)
*F03B 17/06* (2006.01)
*F01K 27/00* (2006.01)
*F03B 17/04* (2006.01)

(58) Field of Classification Search
CPC ...... F01K 13/005; F01K 27/005; F22B 5/005; F22B 27/12
USPC .... 60/643, 398, 477–482, 532, 645; 290/52, 290/43, 54; 137/625; 252/67, 68; 415/4.1, 916; 122/11, 26; 73/12.08, 37
See application file for complete search history.

(56) References Cited

U.S. PATENT DOCUMENTS

| | | | |
|---|---|---|---|
| 3,254,524 A * | 6/1966 | Tannenberg | ................ 73/12.08 |
| 3,810,717 A | 5/1974 | Rakcevic | |
| 3,886,373 A | 5/1975 | Okada | |
| 3,942,549 A * | 3/1976 | Tobin | .............. F16L 55/04 137/207 |
| 3,986,354 A | 10/1976 | Erb | |
| 4,426,846 A * | 1/1984 | Bailey | ............... F03D 9/008 60/398 |
| 4,443,707 A | 4/1984 | Scieri | |
| 4,466,244 A | 8/1984 | Wu | |
| 4,475,334 A | 10/1984 | Kuwabara | |
| 4,797,563 A * | 1/1989 | Richardson | ............... F02C 3/00 290/43 |
| 4,930,993 A * | 6/1990 | Han et al. | ................ 417/226 |
| 5,127,369 A * | 7/1992 | Goldshtik | ............... F01B 21/00 123/19 |
| 5,519,670 A * | 5/1996 | Walter | ............... B01J 19/008 210/188 |
| 6,434,942 B1 * | 8/2002 | Charlton | ............... F01K 27/005 60/641.11 |
| 6,644,937 B2 | 11/2003 | Han | |
| 7,656,050 B2 | 2/2010 | Riley | |
| 9,739,268 B2 * | 8/2017 | Christensen | ............. F03G 7/00 |
| 2002/0023439 A1 | 2/2002 | Sanchez Gomez | |
| 2003/0059292 A1 | 3/2003 | Baker | |
| 2003/0066289 A1 * | 4/2003 | Watten et al. | ................. 60/398 |
| 2006/0236696 A1 * | 10/2006 | Saviharju et al. | ............... 60/643 |
| 2007/0163260 A1 | 7/2007 | Hargreaves | |
| 2008/0256947 A1 * | 10/2008 | Walter et al. | ................. 60/532 |
| 2009/0152871 A1 * | 6/2009 | Ching | ................. 290/54 |
| 2011/0146275 A1 * | 6/2011 | Christensen | ........... F01K 27/005 60/643 |
| 2011/0283705 A1 * | 11/2011 | Oliver | ................. 60/698 |
| 2012/0006023 A1 * | 1/2012 | Johnson et al. | ................. 60/645 |
| 2013/0038062 A1 * | 2/2013 | Salu | ................. 290/52 |

FOREIGN PATENT DOCUMENTS

| | | | |
|---|---|---|---|
| GB | 660752 A | 11/1951 | |
| JP | 57181976 | 11/1982 | |
| WO | WO 2006034580 A1 * | 4/2006 | ............. F15B 21/12 |
| WO | WO 2006/085782 A1 | 8/2006 | |
| WO | WO 2007/076866 A1 | 7/2007 | |

* cited by examiner

TRANSIENT LIQUID PRESSURE POWER GENERATION SYSTEMS AND ASSOCIATED DEVICES AND METHODS

PRIORITY DATA

This application is a continuation-in-part of U.S. patent application Ser. No. 12/928,663, filed on Dec. 16, 2010, which claims the benefit of U.S. Provisional Patent Application Ser. No. 61/284,632, filed on Dec. 21, 2009, each of which are incorporated herein by reference.

FIELD OF THE INVENTION

The present invention relates generally to liquid power generation devices, systems, and associated methods. Accordingly, the present invention involves the mechanical arts field.

BACKGROUND OF THE INVENTION

Devices that use repeating transient confined liquid pressures (such as water hammer pressures) to do work (as defined in physics and having the same measurement units as energy, termed herein and throughout simply as "work") have been in existence for over two centuries. The first appear to have been water hammer type pumps, known as ram pumps, that pump a portion of the water entering the pump to a higher elevation using the liquid transient pressures created within the pump. Ram pumps operate most efficiently where conditions of water flow and upstream water fall or head and downstream water lift are in suitable proportions. Further, ram pumps operate in rather limited circumstances and typically have a substantial waste flow component typically pumping only 10 to 25 percent of the water which enters the pumps and releasing the remaining 75 to 90 percent of the water to waste. Thus, ram pumps are notoriously inefficient in terms of the volume or flow of water needed for their operation in relation to the volume or flow of water actually pumped. Therefore, ram pumps are rarely used for pumping liquids other than water.

SUMMARY OF THE INVENTION

Although known devices of various descriptions use repeating transient confined liquid pressures to do other forms of work, these devices lack efficiency and can waste resources. Recent research by the present inventor accomplished in the development of the systems, devices, and processes disclosed herein has demonstrated improved efficiency and reduced or eliminated the waste of resources.

Accordingly, the present invention provides a transient liquid pressure power generation system and associated devices and methods thereof. In one aspect, for example, such a system may include a liquid source and a transient pressure drive device fluidly coupled to the liquid source to receive liquid from the liquid source. The transient pressure drive device can include a drive component, and a transient wave or pressure producing element to cause a high pressure transient wave in the liquid traveling toward the liquid source to operate the drive component. Additionally, the system can include a heat source fluidly coupled to the transient pressure drive device and the liquid source to receive liquid from the transient pressure drive device and heat liquid returning to the liquid source.

The present invention additionally provides a transient liquid pressure drive device. Such a device may include a liquid conduit fluidly coupleable to a liquid source to receive liquid from the liquid source, a drive component operable to generate power from a transient pressure wave, and a transient pressure producing element operable to cause a transient pressure wave in the liquid to operate the drive component.

The present invention additionally provides a method of generating power with a liquid. Such a method may include obtaining a liquid having a pressure or velocity, conveying the liquid through a conduit, causing a high pressure transient wave in the liquid within the conduit, utilizing the high pressure transient wave to perform work, and heating the liquid.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

Figure 1:
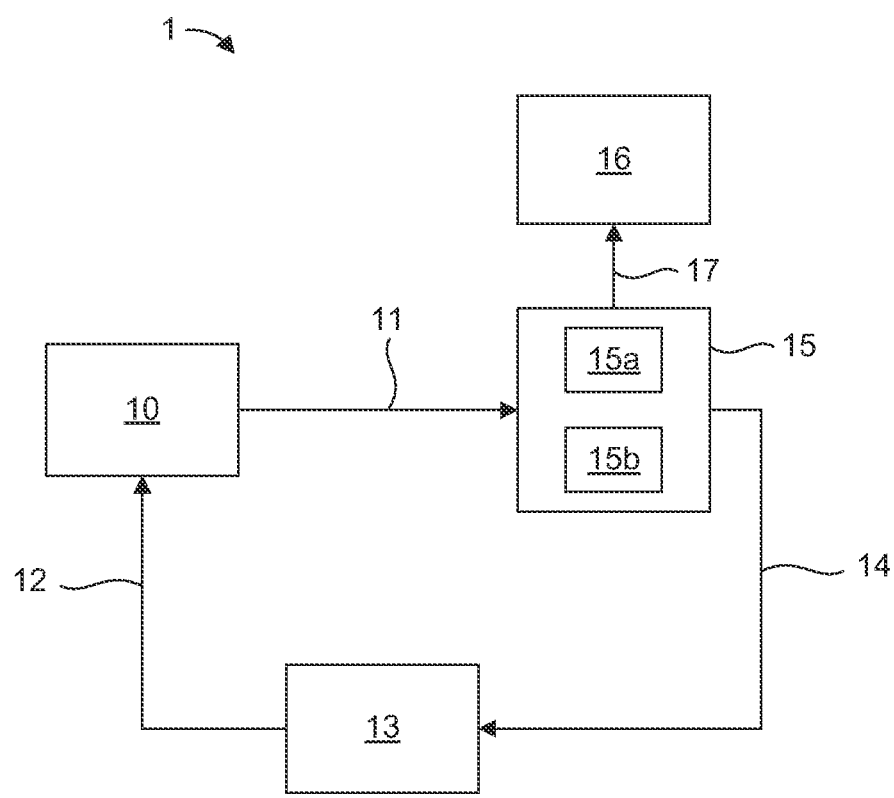
FIG. 1 is a schematic diagram of a transient liquid pressure power generation system, in accordance with an embodiment of the present invention.

In describing and claiming the present invention, the following terminology will be used in accordance with the definitions set forth below.

The singular forms "a," "an," and, "the" include plural referents unless the context clearly dictates otherwise. Thus, for example, reference to "a valve" includes reference to one or more of such valves, and reference to "the conduit" includes reference to one or more of such conduits.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

THE INVENTION

The present invention relates to a transient liquid pressure power generation system, and associated devices and methods. With reference to FIG. 1, illustrated is such a system 1. The system can include a liquid source 10, a transient pressure drive device 15 fluidly coupled to the liquid source, such as by a conduit 11, to receive liquid from the liquid source. The transient pressure drive device can be configured to cause a high pressure transient wave in the liquid traveling toward the liquid source to operate a drive component 15a of the transient pressure drive device. The high pressure transient wave can be caused by a transient wave producing element or device 15b. In one aspect, a transient wave or pressure producing element or device 15b can function to stop or slow liquid flow. In another aspect, a transient wave producing element or device 15b can cause an impact with the liquid. In yet another aspect, a transient wave producing element or device 15b can function to cause a rapid release of pressurized liquid into a stationary liquid. A transient wave producing element or device 15b can therefore include a valve and/or a piston in accordance with the present disclosure. In some embodiments, a drive component 15a can function as a transient wave producing element or device 15b, or vice versa.

In some embodiments, the drive component can be operably coupled via coupling 17 to supply power to a device 16. Additionally, the system can comprise a heat source 13 fluidly coupled to the transient pressure drive device and the liquid source, such as by conduits 14 and 12, respectively, to receive liquid from the transient pressure drive device and heat liquid returning to the liquid source.

The high efficiency confined liquid transient pressure work/energy process can include components whereby any liquid from the liquid source 10 can be released or pumped into a conduit 11, or other suitable conveyance component, and the confined flowing liquid can be conveyed at a velocity to a downstream transient pressure drive device 15. The liquid can enter and pass through the transient pressure drive device 15. As discussed further hereinafter, the transient pressure drive device can have any suitable configuration and construction that can repeatedly produce transient high and/or low pressures in the liquid and can cause the transient pressure to drive the device 16. The device 16 can be directly or indirectly connected to the transient pressure drive device component in any suitable manner via the coupling 17. The transient pressure drive device component can produce the liquid transient high and/or low pressures, for example, by repeatedly stopping, substantially slowing, turning, or partially obstructing the liquid flow in any manner. Liquid flowing through and exiting the transient pressure drive device can thereafter be conveyed to the heat source 13 in any suitable manner, such as by conduit 14. The liquid flow can then return to the liquid source or directly to the conduit 11 in any suitable manner, such as by conduit 12.

In some embodiments, conduit 12, conduit 14, and/or the heat source 13 can be omitted from the system if liquid conservation is not needed for a particular application. In this case, the liquid flow can be released to waste from the transient pressure drive device 15 rather than being returned to the liquid source 10 via the heat source.

It is well known that confined flowing liquids within closed conduit or pipeline systems can undergo rapid changes in pressure, density, and even flow direction when the velocity of the liquid is either increased or decreased. These pressure and density changes are known as hydraulic transients because of their transient and temporary nature. But, though temporary, such transients can have tremendous force and can do work or cause much damage and destruction if not properly controlled in the design and operation of pressure conduit systems.

For example, hydraulic transients, commonly known as "water hammer," can occur in a pressure conduit when confined liquid flow is slowed or stopped too quickly such as when rapidly closing a downstream valve. The rapid valve closure causes alternating high and low pressure waves and alternating reverse and forward flow until the "hammer" action is damped out and stopped by friction or other means. The alternating pressure rise of this hammer action can be very powerful and has been commonly known to break pipelines and even blow buried pipelines entirely out of the ground.

An opposite type of hydraulic transient can occur downstream of a rapidly closing valve where liquid is flowing away from the valve. The mass of the liquid flowing away from the valve creates a low pressure or suction within the pipeline against the valve that has been known to collapse and buckle pipelines.

Described herein is information known about how hydraulic transients occur, analysis of their general behavior, and explanation as to how commonly known "ram pump" systems cause hydraulic transients to do useful work in pumping water. Known information about fluid molecular theory and work processes are also briefly discussed. Also provided are new insights and analyses of liquid transients and processes and how such can be controlled, manipulated, and harnessed in efficient processes that do useful work. Additionally, renewable energy cycle processes are provided that may renew or aid in renewing the thermodynamic properties of the operating liquid so that the liquid can be recycled or re-circulated in a closed liquid system and continue to be used to do useful work.

For convenience and simplicity only, as used herein, the term "water" represents any liquid and the term "pipeline" represents any pressure conduit. So, the term "water" as used herein means any liquid and the terms "pipe" or "pipeline" as used herein mean any pressure conduit or any conduit or vessel that confines liquid flow so that the liquid pressure is, or becomes, anything other than atmospheric pressure during a hydraulic liquid transient.

Confined Liquid Transients/Water Hammer

Whenever the velocity of a confined liquid flowing in a pressure pipeline is increased or decreased, transient pressures result in the flowing liquid that travel up or down the pipeline at a speed that matches the speed of sound in the liquid in the pipeline since sound is itself a pressure wave in the liquid. These transient pressures are often referred to as water hammer. It is commonly known that water hammer occurs when a flowing liquid is stopped rapidly such as when closing a valve rapidly. The change in the momentum of the liquid momentarily and cyclically creates elastic reactions in the liquid and a series of alternating positive and negative pressure waves and liquid flows travel back and forth in the pipeline at the speed of sound the magnitude being reduced in each cycle by friction until eventually being "damped out" by the friction. Using Newton's Second Law, a commonly accepted and experimentally proven equation for computing the initial pressure rise in the pipeline at the valve for rapid valve closure is Joukowsky's equation expressed as:

$$P_i = \rho c_p v \quad (1)$$

Where
$P_i$=initial pressure rise
$\rho$=liquid density
$c_p$=the speed of sound in the liquid within the pipeline
$v$=initial velocity in the liquid The well-known derivation of this equation is provided below. In English Units, $P_i$ has units of pounds per square feet (lbs/ft$^2$). Expressed in feet (ft) of pressure head or in pounds per square inch (psi), the equation is respectively:

$$P_{i(ft)} = \frac{c_p v}{g} \text{ or, } P_{i(psi)} = \frac{c_p v}{2.31 \, g} \text{ where} \quad (2)$$

$$g = \text{acceleration of gravity}$$

This initial transient pressure $P_i$ begins a pressure wave that travels rapidly back up the pipeline from the valve at speed $c_p$ toward the liquid source as each upstream element of liquid is brought to a stop. The speed $c_p$ depends upon the bulk modulus of elasticity of the liquid and the thickness and rigidity (or bulk modulus of elasticity) of the pipeline walls and can be measured, or can be estimated, using well-known equations not presented here. An additional much smaller pressure rise $P_p$ then builds at the valve as upstream friction progressively attenuates the initial pressure rise upstream and progressively causes a residual upstream pressure and velocity to remain. That residual upstream pressure and velocity causes additional compression in the downstream liquid as each upstream liquid element is brought to rest "packing" additional water into the pipeline against the valve causing an additional and much smaller pressure rise, $P_p$.

The initial transient pressure rise $P_i$ and the packing pressure $P_p$ are in addition to the original pressure at the valve prior to the valve closure. So, the total pressure at the valve is:

$$P_t = P_o + P_i + P_p \quad (3)$$

where
$P_t$=the total pressure at the valve after closure;
$P_o$=the original pressure at the valve before closure To illustrate, consider a simple pipeline system having a downstream valve initially discharging water from a reservoir connected to the upstream end of the pipeline. If the downstream valve is quickly closed, the initial pressure rise $P_i$, as predicted by equations (1) or (2), immediately occurs in the small increment or element of water stopped by the valve. The pressure rise is then transmitted upstream to the next element causing it to stop thus forming a pressure wave front traveling at speed $c_p$ back up the pipeline in the opposite direction of the original flow. Downstream of the wave front the liquid has stopped and increased in pressure by the initial rise pressure rise $P_i$ and the pipeline has expanded or stretched slightly. Upstream of the wave front the velocity and pressure of the liquid and the pipeline diameter remain unchanged with flow continuing toward the valve as before until the pressure wave front progressively stops the flow as it rapidly transmits back up the pipeline.

As the wave front reaches the reservoir, the flow is momentarily stopped in the entire pipeline, but because the pressure in the pipeline now exceeds the pressure from the reservoir the liquid is not in equilibrium. This lack of equilibrium causes an over-reaction and reverse flow begins from the pipeline into the reservoir at essentially the original velocity, but in the opposite direction reduced slightly by friction. This reverse flow causes a pressure relief wave to travel back down the pipe toward the valve. The relief wave front pushes water backward up the pipeline toward the reservoir through expansion of the water and contraction of the pipeline to its original size at the wave front.

When the pressure relief wave front reaches the valve, the reservoir pressure minus the friction loss is momentarily restored in the entire pipeline. But, because the water is then flowing away from the valve toward the reservoir, its inertia, or momentum, exerts a negative pressure against the valve dropping the pressure at the valve. This low pressure at the valve, friction, and the pressure in the reservoir at the other end in a short time stop the reverse flow toward the reservoir. But, because low pressure then exists at the valve, the flow reverses and flow toward the valve begins again driven by the reservoir pressure toward the valve. When that reservoir pressure and flow wave reaches the closed valve, the flow abruptly stops again, the pressure immediately rises, and the cycle begins again.

This cyclic process is repeated until damped out by friction causing a "hammering" effect against the valve and the pipe walls. Each pressure cycle becomes smaller in amplitude due to friction. The oscillations of progressively decreasing pressure and flow continue over time until damped out by friction.

So, equations (1), (2), and (3) predict the initial positive pressure rise for the first water hammer cycle resulting from a rapidly closed valve. Thereafter, each succeeding pressure rise at the valve becomes smaller until entirely damped out by friction. The oscillating transient pressure waves travel very quickly up and down the pipeline at speed $c_p$, which pressure wave speed matches the speed of sound in the liquid within the pipeline. The time required for one-half of the hammer cycle is computed by the equation:

$$t_c = 2L/c_p \quad (4)$$

Where
$t_c$=the wave travel time from the reservoir and back to the valve
L=the pipeline length The half cycle time $t_c$, sometimes termed the characteristic time for the conduit, is the time that a positive pressure is maintained at the valve. If the valve closure time is faster than the half cycle time, then the maximum positive pressure rise as predicted by equations (1), (2), and (3) will occur. But, if the valve closure time is slower, one or more returning negative pressure waves superimpose upon the positive waves caused by the closing valve and the initial pressure rise becomes smaller. Thus, the slower the closure time for the valve, the lesser the initial pressure rise so that a very slowly closing valve will cause little pressure rise. But, in contrast, any valve closure time faster than the half cycle time $t_c$ will cause the maximum positive pressure rise. So, the half cycle time $t_c$, which depends on the pipeline length L and the wave speed $c_p$, can be termed the effective closure time for the valve because any faster closure time than the half cycle time t will result in the same maximum positive pressure rise predicted by equations (1), (2), and (3).

But importantly, if the initial positive pressure increase is sufficient, another important phenomenon will occur that interrupts the water hammer cycle at the end of the first half cycle. If at time $t_c$ the pressure at the valve tries to drop below vapor pressure when the first returning negative pressure wave returns to the valve, the water column at the valve vaporizes and ruptures. This vaporization occurs because liquids cannot sustain pressures below their vapor pressure and so turn to gaseous vapor. The resulting rupture of the column of water in the pipeline is called column separation.

When column separation occurs, the flow into the reservoir will continue away from the valve as near rigid body flow with only a small decrease in flow. The momentum of the water column flowing away from the valve causes additional vaporization of water near the valve and the vapor cavity grows until the flow away from the valve is stopped by the friction, the reservoir pressure, and the low pressure in the vapor cavity.

The slowing process for the water in the pipeline takes a much longer time because the water column acts as a near rigid body with momentum rather than as a pressure wave moving through the liquid. The action is more of a surge of water moving toward the reservoir at slightly less than the original flow velocity rather than that of a pressure wave traveling at the speed of sound.

When the near rigid body flow toward the reservoir slows and stops due to the higher reservoir pressure, friction, and the lower vapor pressure at the valve, the flow reverses back toward the valve driven by the reservoir pressure and causes the vapor cavity to begin to collapse. At the instant the vapor cavity entirely collapses and disappears, another, but smaller, positive pressure transient is generated and the cycle repeats itself until damped out by friction.

Confined Liquid Transients from Rapid Downstream Valve Opening

Confined liquid pressure transients also occur during the rapid opening of a downstream valve. As is well known, when a closed valve having an upstream pipeline filled with liquid is opened, the initial flow velocity is predicted by Equations (1), (2) or (3) rearranged to predict flow velocity as follows using Equation (2):

$$v = \frac{P \, g}{c_p} \quad (5)$$

Where
v=initial flow velocity (ft/s)
P=initial pressure (ft)

A negative pressure wave from the flow at the valve and the accompanying release of the pressure transmits up the pipeline to the source at speed $c_p$. Downstream of the pressure wave, the flow is restored to the velocity predicted by Equation (5) reduced by the friction in the section of pipeline from the valve to the rapidly moving negative pressure wave. When the negative pressure wave reaches the reservoir, the flow into the pipeline nearly doubles at the entrance—one near full increment caused by the negative pressure resulting at the pipeline entrance and another near full increment caused by the positive reservoir pressure. This positive pressure wave and near doubled flow then transmits back down the pipeline at the speed $c_p$, with the pressure and flow damped slightly again by friction. When the positive pressure wave and near doubled flow reaches the open valve and exits, the increased exit flow again causes another but lesser negative pressure wave to transmit back up the pipeline. The process repeats with lesser and lesser flow increases until steady state flow is reached in the pipeline. The flow rate stabilizes at steady state because the pipeline friction and entrance and exit energy losses exactly equal the available potential pressure energy.

Confined Liquid Transients from Rapid Change of Upstream Flow

Another type of commonly known confined liquid pressure transient occurs when an upstream valve, rather than downstream valve, is rapidly closed. The mass and momentum of the liquid flowing away from the valve creates a low pressure or suction within the pipeline at the valve. The low pressure progresses downstream as long as the liquid continues to flow. If the flow does not exit from the end of the pipeline, the forces of friction, downstream pressure (if any), and the upstream low pressure near the valve eventually bring the flow to a stop.

But, as long as the downstream flow continues, the pressure continues to drop at the valve and progressively downstream until the pressure at the valve reaches vapor pressure. At vapor pressure, the liquid vaporizes at the valve and the liquid column ruptures. As the liquid continues to flow away from the valve, a vapor cavity forms at the valve and increases in size progressing downstream as long as the liquid continues to flow away from the valve. This action has been known to crumple and collapse pipelines from the force of atmospheric pressure against the near vacuum within the pipeline.

If the pipeline can withstand the outside atmospheric pressure forces, the vapor cavity that forms at the valve grows until eventually the flow is brought to a stop. The flow then reverses due to atmospheric pressure and downstream pressure (if any). The reverse flow collapses the vapor cavity causing a water hammer reaction in the pipeline that will continue until damped out by friction. But, in general, a low pressure transient is constrained by the vapor pressure of the liquid.

Ram Pump Operation and Efficiency

Ram pump technology has been around since the late 1700's. A ram pump uses transient confined liquid pressures to automatically pump water to a higher elevation using only the energy of flowing water. A typical ram pump system comprises a drive pipeline leading from a water source, to a pump unit having a waste valve and an outlet check valve leading to an air chamber and a pump discharge/outlet pipeline. The pump outlet pipeline carries the pump pressurized water to its desired destination at a much higher elevation than the water source. Various configurations and constructions of waste valve, air chamber, and outlet pipeline have been found to work with some more efficient than others. But, each basically operates in similar manner in that water is introduced into the drive pipeline from the water source at an elevation sufficiently higher than the waste valve to create velocity in the drive pipeline and waste valve sufficient to cause the waste valve to alternately close and reopen.

The water flows from the source down the drive pipeline through an initially open waste valve discharging water to any channel or configuration that can continuously accept the waste flow and convey it away from the waste valve. As the velocity through the waste valve increases, the drag forces of the increasing water flow through the valve at some point result in rapid closure of the valve. The rapid closure of the waste valve causes high transient pressures in the pump unit and the drive pipeline which in turn causes the check valve leading to the air chamber and pump outlet pipeline to open and let high transient pressurized water into the air chamber. The water entering the air chamber through the check valve compresses the air in the chamber and causes water to flow up the outlet pipeline to discharge from the pipeline at an elevation much higher than that of the water source. At some point, the transient pressures at the waste valve and in the drive pipe reduce below the pressure in the air chamber and outlet pipeline and the check valve closes preventing reverse flow and maintaining the pressure in the air chamber and outlet pipeline. The closing of the check valve and remaining transient pressures in the pump body causes a back pressure surge transient to travel back up the drive pipeline to the source. The back surge relieves the pressure at the waste valve causing the waste valve to reopen and the flow in the pipeline then reverses. Water begins again to discharge through the waste valve and the cycle begins again.

Meanwhile, during the time of the back surge and subsequent waste flow in the drive pipeline of the next cycle, the check valve remains closed and the compressed air in the air chamber continues to push water up the discharge pipeline until the pressure in the air chamber equalizes with the water pressure elevation at the discharge pipeline outlet. The air chamber thus functions to even out the pumped flow by accepting and storing water through compression of the air in the chamber during the time of high transient pressures (pressures greater than the outlet water pressure elevation). Then as the transient pressures drop and the check valve closes, the air chamber pushes the temporarily stored water up the outlet pipeline to its outlet during the time of lower pressures in the drive pipeline and waste valve.

Ram pump cycle times can range from 30 to 100 cycles per minute and are often most efficient in the range of 60 cycles per minute. Ram pump system efficiency is commonly evaluated by dividing the pumped flow rate times its pumped elevation head by the total drive pipe flow rate (pumped flow plus waste flow) times the water source elevation head as follows:

$$E_p = \frac{Q_p H_p}{(Q_p + Q_w) H_s} \qquad (6)$$

Where
$E_p$=Ram pump system power efficiency
$Q_p$=Pumped water flow rate
$Q_w$=Wasted water flow rate
$H_p$=Pumped water elevation head
$H_s$=Source water elevation head This power efficiency $E_p$ can range from 0 to above 0.85 (0 to above 85 percent), depending upon the overall design of the system with typical efficiencies in the range of 0.60 (60 percent efficient). That means that 60 percent of the power of the water entering the drive pipeline from the water source is transferred to, and maintained in, the power of the pumped flow while 40 percent of the power is lost in the discharge of the waste flow. Ram pump volumetric efficiency is commonly computed as follows:

$$E_{vol} = \frac{Q_p}{(Q_p + Q_w)} \qquad (7)$$

Where
$E_{vol}$=Ram pump volumetric efficiency
$Q_p$=Pumped water flow rate
$Q_w$=Wasted water flow rate The volumetric efficiency is often quite poor ranging as low as 0.05 to 0.10 (5 to 10 percent pumped flow versus 90 to 95 percent wasted flow). Due to the large waste flow compared to the flow of the water pumped, ram pumps are not practical in many applications. But, where water flow is abundant with only the need of pumping a minor percentage of the source water, ram pumps have proven to reliably provide pumped water for more than 50 years of operation.

Going back to the commonly accepted method of computing ram pump efficiency expressed in Equation (6), the method is actually rather curious in that it evaluates the overall power efficiency of the entire system (the ram pump with its upstream and downstream pipelines) rather than the power efficiency of only the ram pump itself. In contrast, evaluation of the power efficiency of turbines focuses solely on the efficiency of the turbine unit itself in converting water pressure and flow energy into mechanical energy. If the turbine drives a pump, then the efficiency analysis of the combined turbine-pump unit focuses solely on the efficiencies of the two units working together in transferring and imparting the energy of the flow entering the turbine to the energy of the pumped water discharging from the pump. The overall system friction caused power losses of getting flowing water to the turbine in the upstream penstock pipeline and of conveying water downstream away from the turbine in the downstream discharge pipeline are entirely neglected in the efficiency evaluation because they really have nothing to do with the efficiency of the turbine unit or the combination turbine-pump unit themselves.

But, with a ram pump a problem is presented. During the actual pumping part of the cycle (the pumping period), there is only a very small loss in the energy of the flowing water as it exits the drive pipeline and pump body through the check valve into the air chamber and discharge pipeline while there is a large energy gain in pressure and elevation of the pumped water. So, the energy efficiency of the pump itself during the actual pumping period is over 100 percent because all of the flow entering and exiting the pump during the pumping period of the cycle is being pumped. During the pumping part of the cycle only, the power efficiency equation becomes:

$$E_a = \frac{Q_p H_p}{Q_p H_s} = \frac{H_p}{H_s} \quad (8)$$

Where
$E_a$=Actual ram pump power efficiency
$Q_p$=Pumped water flow rate
$H_p$=Pumped water elevation head
$H_s$=Source water elevation head Since, during the actual pumping period, the only water flow through the ram pump is the pumped water $Q_p$, $Q_p$ appears both in the numerator and denominator and the equation reduces to $E_a=H_p/H_s$. Since $H_p$ is always greater than $H_s$ for a functioning ram pump, the pump efficiency during the actual pumping period only is always greater than 1.0 or 100 percent.

Additional information and analysis of ram pump operation and additional background in the physics of fluids is provided hereinafter.

Fluid Molecular Behavior

Well accepted and verified molecular theory of fluids (gases and liquids) is provided herein. It is well accepted that the molecules of a gas have kinetic energy that causes the molecules to continually and randomly move about, and that this molecular movement is often influenced by other forces such as gravity, molecular attractions, and collisions with other molecules and objects in the path of their trajectory. This molecular kinetic energy is part of the internal thermal energy of the gas. The greater the internal thermal energy, the greater the molecular kinetic energy. Conversely, the lesser the internal thermal energy, the lesser the molecular kinetic energy of the gas.

On earth, atmospheric pressure is exerted on everything exposed to the atmosphere and is caused by the weight of the air column above (surrounding) the earth and by the energy of the collisions of the air molecules with things on earth. When a gas is placed into a closed container, the kinetic movement of the gas molecules causes the gas molecules to fill the container and to collide with the container walls. The sum of these numerous collisions exerts a force, termed pressure, on the inside of the walls of the container and on the molecules and anything else inside the container itself. When that pressure is equal to atmospheric pressure, the pressure forces on the outside of the container and the pressure forces inside of the container are the same.

If the gas in the container is heated, the kinetic energy of the gas molecules increases thereby increasing the force of the collisions of the gas molecules against the container walls and the other gas molecules in the container, that is, the pressure within the container increases. Because, the pressure force against the inside of the container walls becomes greater than the atmospheric pressure on the outside of the container walls, strain is caused in the container walls. If the walls are sufficiently flexible, the walls of the container will expand. Conversely, if a gas in a closed container initially at atmospheric pressure is cooled, the opposite reaction occurs. The kinetic energy of the molecules decreases causing lesser collision forces so pressure decreases and the walls of the container may contract.

Going back to the gas in a container at atmospheric pressure, if a force above atmospheric pressure is exerted against a container wall such that the size of the container, or of the container space confining the gas, is decreased, the kinetic energy of the gas molecules causes increasing and more forceful molecular collisions against the container walls and the pressure force within and against the container walls thus increases.

In contrast, the behavior of liquids has both important similarities and important differences from that of gases. It is well known that unlike gases, the molecular attractions between liquid molecules become sufficiently important to constrain the kinetic movement of liquid molecules to a defined space. That defined space is the volume of the liquid at equilibrium and is determined by the molecular makeup of the liquid itself and by the internal energy content of the liquid. Like gases, when internal thermal energy content decreases, the volume of a liquid decreases, and when internal energy increases, the volume of the liquid increases, though molecular forces between the liquid molecules considerably constrain the increases and decreases. Also like gases, part of the internal thermal energy content of liquids is comprised of molecular kinetic energy that causes the liquid molecules to continually move about and collide with each other and the walls of their container. Their movements are simply restrained by the attractions of the liquid molecules to each other so that each molecule moves randomly in a relatively narrow space. But, it is the molecular collision forces, the sum of which contributes to liquid pressure, that are important in understanding the behavior of transient pressures in confined liquids.

Finally, unlike gases, it is well known that liquids are not easily compressed because the internal energy forces of the molecules within a liquid very strongly resist compression. For example, the bulk modulus of elasticity for water is 305,000 pounds per square inch (psi) at 50° F. That means that a 30.5 psi pressure change in water, which is equivalent to 70.5 feet of water pressure head, produces only a one ten thousandth (0.0001) change in volume and 705 feet of water pressure head produces only a one thousandth (0.001) change in volume.

So, in unconfined water flow and non-transient confined flow, water behaves essentially as an incompressible fluid so that the physics of most water flow and water power conditions can be acceptably analyzed assuming water to be incompressible. However, when transient pressures are caused in confined flow in a pipeline or pressure conduit, the behavior of water and other liquids becomes like that of compressible fluids and the physics of compressible fluids must be applied. But, it must be remembered that for liquids, the equilibrium between the molecular attractions and the internal energy of the fluid molecules requires that a liquid must occupy a certain volume of space, no more and no less. If that volume is less, then the pressure and reaction of internal forces increase accordingly.

Fluid Transient Work Processes

Gas transient work processes involve changes in the volume and pressure of a gas in a confined space. It is well accepted that the amount of work that is done by a particular process involving a gas depends on how the pressure and volume are allowed to change in the process. An important example process can be illustrated by considering a closed and completely insulated container divided into a lower chamber and upper chamber by a rigid membrane having gas in the lower chamber and a completely empty space under vacuum in the upper chamber. If the membrane is somehow removed or broken without opening the container, the kinetic energy of the gas molecules will cause the gas to rapidly expand from the lower chamber to entirely fill both chambers. A lower pressure will result because the molecules will have more space within which to move. Most importantly in this case, the gas does no work because no force is required for the gas to expand into the vacuum.

On the other hand, it is well known that work can be done by the same gas in the lower chamber as it expands into the space of the upper chamber if the process is changed and configured correctly. The membrane can be replaced by a moveable piston sealed against the walls of the container with the upper chamber open to the atmosphere and exactly enough weight on the piston to hold it down against the pressure of the gas in the lower chamber. When most of the weight is removed from the piston, the lower chamber pressure, resulting from the kinetic energy of the collisions of the gas molecules against the bottom of the piston, causes the piston and the remaining weight upon the piston to rise while the gas expands beneath the piston into the space of the upper chamber. In so doing, the expanding gas does work upon the piston and remaining weight by causing them to move a distance upward through most of the space of the upper chamber. In this case, work is done because the pressure force of the gas in the lower chamber pushes the piston and remaining weight a distance upward.

Similarly, the moment a confined liquid under transient pressure is allowed to expand into an empty space such, as the upper chamber, the liquid molecules simply use more space in their random kinetic movements. The difference is that, if the empty space is larger than needed for equilibrium, other internal molecular forces within the liquid constrain the liquid molecules to the volume or space that results in molecular equilibrium. So, the liquid only expands to is equilibrium volume which volume may not fill the upper chamber space. Further, as with the gas, the liquid does no work in that natural expansion to its equilibrium volume. The liquid simply expands to its equilibrium volume filling only that volume of empty space that is needed for that volume. Part of the liquid may vaporize because pressure is initially below vapor pressure, but no work is done.

If the empty space is replaced with air open to the atmosphere, the expansion of the liquid does a very small amount of work in pushing air away as it expands to its equilibrium volume, but little to no useful work is done. Finally, if the empty space is replaced with air either at atmospheric pressure or above but confined in an air tight container, the expansion of the liquid into the space occupied by the air does only the amount of work needed to compress the air and allow the liquid to expand to its equilibrium volume. The result is air slightly compressed above the initial air pressure in the chamber, which can be useful as in the typical ram pump design, but again most of the liquid transient pressure is relieved without doing work.

As is discussed hereinafter, these two fluid processes, one that does work through expansion and one that does not, are useful in understanding and explaining the behavior of liquid fluid transients and how to make those transients efficiently do work.

Work and Heat

Well accepted laws of thermodynamics hold that energy is never created nor destroyed, but that energy can be transferred between molecules of matter through either the processes of work or heat. Work is defined in physics as the process of moving a mass of any substance over a distance. In accomplishing that process, energy is transferred to or from the mass moved and work can thereby transfer energy in or out of a system.

Heat is also an energy transfer process that operates when two bodies of mass that are at different temperatures, hence at different energy states, are in close enough proximity to each other to cause energy transfer. Through the process of heat, the energy from the mass of higher temperature and thus, higher internal energy, transfers to the mass of lower temperature and internal energy. Because, as recognized by the verified laws of thermodynamics, the heat process can only operate to transfer energy from a state of higher energy to a state of lower energy, the heat process continues only until the temperatures of the two masses equalize. At that point, the heat process ends.

The important principle here is that both the work and heat processes can act to increase or decrease the internal thermal and kinetic energy of a mass.

Other Principles and Information

Other principles, formulae, and information include:

1. The full energy equation for a flowing liquid expressed in dimensions of energy per unit mass is:

$$u_1 + \frac{P_1}{\rho_1} + \frac{v_1^2}{2} + gz_1 \pm E_m + E_H = u_2 + \frac{P_2}{\rho_2} + \frac{v_2^2}{2} + gz_2 \qquad (9)$$

Where:
$u_1$=initial non-pressure internal energy
$u_2$=final non-pressure internal energy
$P_1$=initial pressure
$P_2$=final pressure
$\rho_1$=initial liquid density
$\rho_2$=final liquid density
$P_1/\rho_1$=initial pressure energy
$P_2/\rho_2$=final pressure energy
$v_1$=initial velocity
$v_2$=final velocity $v_1^2/2$=initial kinetic energy
$v_2^2/2$=final kinetic energy
g=acceleration of gravity
$z_1$=initial elevation
$z_2$=final elevation
$gz_1$=initial potential gravity energy
$gz_2$=final potential gravity energy
$E_m$=energy entering or leaving the system as mechanical work
$E_H$=energy entering or leaving the system as heat flow (including friction loss)

2. The kinetic energy quantity $v_1^2/2$ converts to $v_1^2/2$ g (g=acceleration of gravity) when the units are in feet of water commonly referred to as "head."

3. The pressure force F is equal to PA (F=PA) where P=pressure and A=Area on which the pressure acts. Also, flow rate Q is equal to Av (Q=Av) or flow area times velocity.

4. The well-known momentum equation for steady incompressible liquid flow is:

$$F_1 - F_2 = \rho Q v_2 - \rho Q v_1 = \rho Q(v_2 - v_1) \quad (10)$$

where:
$F_1$=initial pressure force against the flow volume
$F_2$=final pressure force against the flow volume
Q=flow rate
$\rho$=liquid density
$v_1$=initial velocity vector
$v_2$=final velocity vector
$\rho Qv$=the momentum flux The quantity $\rho Qv$ is known as the momentum flux which is the momentum force of the liquid. Now consider a free body diagram of a short liquid element in a flowing pipeline located immediately upstream of a valve. At steady incompressible flow, the forces are as follows:

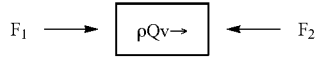

$F_1$ is the pressure force on the element driving the flow. The quantity $\rho Qv$ is the momentum flux of the element of flowing liquid, $F_2$ is the downstream force on the element opposing the flow, and force $F_1$ comprised of downstream friction and pressure forces. Because the element is short, the friction force is very small and can be neglected or lumped in with force $F_2$ opposing the flow. Summing the forces for the flowing liquid yields:

$$F_2 = \rho Qv + F_1 \text{ or } F_2 - F_1 = \rho Qv$$

So, the difference between the two forces acting on the short liquid element, $F_2-F_1$, is equal to the momentum flux $\rho Qv$. Now consider what force it would take to instantaneously stop the liquid flow. The resisting force would need to be sufficient to resist both the driving force $F_1$ and the momentum flux force, $\rho Qv$. As shown here, $\rho Qv$ is equal to $F_2-F_1$. So, that much additional force ($F_2-F_1$) is needed to overcome the momentum flux. The free body diagram of the forces for instantaneously stopping the flow is as follows:

Summing the forces, the equation for stopping the liquid under incompressible conditions yields:

$$F_1 + \rho Qv = F_2 + (F_2 - F_1) \text{ or } 2(F_2 - F_1) = \rho Qv$$

Remembering F=PA where P=pressure and A=Area on which the pressure acts, and that Q=Av, the equation becomes:

$$P_2 A - P_1 A = \frac{\rho A v^2}{2}$$

which simplifies to:

$$P_2 = P_1 + \frac{\rho v^2}{2}$$

Thus, for incompressible liquid flow, the final pressure $P_2$, is equal to the initial pressure $P_1$ plus the quantity $\rho v^2/2$ and the change in pressure, $P_2-P_1$, is thus equal to $\rho v^2/2$; or, in units of head or feet of water, is equal to $v^2/2$ g. That quantity, $\rho v^2/2$ or $v^2/2$ g, is the kinetic energy of the liquid in the energy equation.

5. For compressible liquid flow, it is well accepted and verified that the effect of rapid changes in liquid momentum cannot be analyzed assuming incompressible flow, but must be analyzed using the momentum-impulse equation of Newton's second law:

$$F \, dt = m \, dv$$

where
F=force applied to change the momentum
dt=time the force is applied
m=mass of the liquid
dv=change in velocity of the liquid If a confined liquid in a pipe is stopped instantaneously, it has been determined that a pressure wave travels up the pipe at the velocity of a pressure wave within the pipeline liquid $c_p$, which velocity is also the speed of sound within the pipeline liquid. That pressure wave is formed in a short interval of time, dt, as an element of liquid of length, $c_p$ dt, comes to rest. Applying Newton's Law while neglecting friction:

$$F \, dt = m \, dv; \text{ Or, } -A \, dp \, dt = \rho A \, c_p \, dt \, dv$$

which simplifies to: $-dp = \rho \, c_p \, dv$

Since velocity is reduced to zero, $dv = -v$ and dp is the resulting pressure transient, upon integration the equation for the initial transient pressure becomes:

$$P_i = \rho \, c_p \, v \text{ which is equation (1) above.}$$

Thus, application of impulse momentum principles yields equations (1) and (2) above for an initially flowing liquid. So, for any point of interest in the upstream pressure conduit, the pressure rise $P_i$ as the wave reaches that point can, neglecting friction, be evaluated from the impulse momentum equation F t=m v, $P_i$ A t=m v, or $P_i$=m v/A t; where A is the conduit area, time t is equal to the length (L) of the upstream pressure conduit to the point of interest divided by the speed of the pressure wave $c_p$, or $t = L/c_p$, and the mass (m) is that mass of the liquid in the conduit from the point of change to the point of interest (the liquid mass affected by the change to the point of interest).

6. In a flowing liquid, the fluid molecules are the mass of the liquid and each molecule individually has inertia or momentum, while the collective effect of that individual molecular inertia or momentum is exhibited in the behavior of the liquid as a whole.

7. The wave speed, $c_p$ is directly related to the rigidity or flexibility of the pipeline. The more rigid the pipeline, the greater the pressure wave speed $c_p$ and the greater the transient pressure rise, and conversely, the more flexible the pipeline, the lesser the wave speed and the lesser the transient pressure rise. A representative galvanized steel pipeline pressure wave speed, $c_p$, is about 4,590 feet per second.

8. Devices that relieve and dissipate transient pressures have been known and in use for a long time. They each work under the same basic principle—relieve the confinement of the liquid and the excess pressure dissipates.

9. The second law of thermodynamics requires that there must be an energy loss from liquid entering and flowing in a pipeline, not an energy gain.

10. Transient pressure waves, or wave pulses, traveling in liquids confined in a conduit are affected by changes and discontinuities in the conduit such as diameter or area changes, junctions or tees, dead-ends or closed valves, exits and entrances to tanks, reservoirs, pressure dissipation devices, and the like. When a transient wave pulse reaches such discontinuities the wave pulse reflects back and/or transmits through the change or discontinuity as a new set of one or more wave pulses. Except most conduit bends cause relatively minor disturbance to the transmittal of transient wave pulses so that they can be usually treated as friction losses, but transient wave pulses are nevertheless disturbed wherever flow velocity changes occur.

Importantly, at diameter or area changes, the instant a wave pulse of a particular pressure reaches the diameter or area change, a new wave pulse reflects back at a different pressure and travels back up the conduit in the opposite direction while a new wave pulse transmits at a different pressure through the diameter or area change and continues traveling down the conduit in the same direction as the original wave pulse. The new reflected and transmitted wave pulse pressures are computed applying the principles of mass and linear momentum conservation in the following equations:

$$\Delta P_t = \frac{2 c_{p1} A_2}{c_{p2} A_1 + c_{p1} A_2} \Delta P_o \text{ and } \Delta P_r = \Delta P_o - \Delta P_t$$

Where
$\Delta P_o$=Original incoming wave pulse pressure
$\Delta P_r$=Reflected wave pulse pressure
$\Delta P_t$=Transmitted wave pulse pressure
$A_1$=Upstream conduit area
$c_{p1}$=Upstream conduit wave speed
$A_2$=Downstream conduit area
$c_{p2}$=Downstream conduit wave speed If the wave speeds are the same upstream and downstream the wave speed terms may be dropped from the equation so that the equations become:

$$\Delta P_t = \frac{2 A_2}{A_1 + A_2} \Delta P_o \text{ and } \Delta P_r = \Delta P_o - \Delta P_t$$

Increases in downstream pipe diameter or conduit area, or decreases in wave speed cause a decrease in the magnitude of the wave pulse pressure transmitted downstream and an increase in the magnitude of the wave pulse pressure reflected back upstream. The opposite is true for a downstream pipe diameter or conduit area decrease or wave speed increase. An increased pressure wave pulse is transmitted downstream and a decreased pressure wave is reflected upstream.

Similarly, at junctions or tees, a new wave pulse reflects back up the upstream conduit and new wave pulses are transmitted down the downstream conduits with pressures computed by applying the principles of mass and linear momentum conservation as follows:

$$\Delta P1_r = \Delta P2_t = \Delta P3_t = \frac{2 c_{p1} c_{p2} A_3}{c_{p2} A_1 + c_{p1} A_2 + c_{p3} A_3} \Delta P_o$$

Where
$\Delta P_o$=Original incoming wave pulse pressure traveling in incoming conduit 1
$\Delta P1_r$=Reflected wave pulse pressure back up incoming conduit 1
$A_1$=Incoming conduit 1 area
$c_{p1}$=Incoming conduit 1 wave speed
$\Delta P2_t$=Transmitted wave pulse pressure in downstream conduit 2
$A_2$=Downstream conduit 2 area
$c_{p2}$=Downstream conduit 2 wave speed
$\Delta P3_t$=Transmitted wave pulse pressure in downstream conduit 3
$A_3$=Downstream conduit 3 area
$c_{p3}$=Downstream conduit 3 wave speed Again, if the wave speeds are the same upstream and downstream the wave speed terms may be dropped from the equation. Changes in diameter and wave speed at the tees or junctions have the same effect as described above for changes in diameter and wave speed at any other pipe or conduit diameter or area change.

At dead ends and closed valves, the wave pulse reflects back upstream as a new wave pulse at a pressure double to that of the original incoming wave pulse. This occurs because the incoming wave pulse induces a velocity in the conduit toward the dead-end. That velocity then causes a further and double compression of the liquid at the dead-end resulting in the reflection of a new wave at double the incoming wave pulse pressure. The doubled pressure then travels as a wave pulse in the reverse direction back up the conduit away from the dead-end.

Transient Pressure Energy Processes

The process of water hammer as well as the operation of ram pumps as explained above is instructive as to what actually happens in these processes and why. First of all, in water hammer, the transient pressure wave returning to the liquid source has more total energy than the potential energy of the source that provided it on the first return of the positive transient pressure wave back to the liquid source.

At the instant the transient pressure wave from the rapidly closed valve reaches the reservoir the flow in the pipeline has completely stopped. For an instant before the flow reverses and water flows back into the reservoir, the water in the pipeline is at a much higher pressure and thus higher potential energy than it originally started with when the water originally entered the pipeline from the reservoir. Then because the pressure is higher, the flow reverses and water flows under the higher pressure and potential energy back into the reservoir.

The following provides analysis, basic theory, and design principles to avoid dissipation of confined liquid transient pressure energy and to harness and replenish this energy in energy cycles, and presents and discusses confined liquid transient pressure work processes.

Liquid Transient Theory and Analysis

1. The Role of Molecular Momentum

It is known that the transient pressure increase is immediate at the valve as the liquid comes to a stop. It is also known that the pressure increase is directly related to the momentum of the liquid since the accepted and verified equations (1) and (2) above are derived using momentum analysis. It is also known that at the instant of the pressure increase that forms and begins the pressure wave front in the liquid immediately upstream of the valve, the liquid upstream of the pressure wave front has not yet come to a stop. Each of these known principles are discussed hereinabove.

Thus, it is known that the immediate pressure increase in the liquid at the valve is caused by an impulse force applied against the momentum of the liquid, but that this immediate rise is not caused by the momentum of the upstream liquid column. But rather, it is known that the pressure increase is caused by the elastic reaction of the liquid at the pressure wave front.

That means that the immediate pressure rise at the wave front is not caused by collisions with the upstream water column, but rather only by collisions with the downstream water column. So, the high pressure impulse caused by a closing valve is not, and cannot be, caused by any part of the water column upstream of the pressure wave front because the liquid upstream of the wave front has not yet received any effect of the closing of the valve. Rather, the upstream liquid still flows as if no valve closure had occurred. So, the initial pressure increase at the valve, and at the wave front as it travels back up the pipeline, must result from an elastic momentum effect on the liquid.

The key to understanding how to harness transient pressure energy to do useful work is found in an analysis of the momentum impulse effect on the individual liquid molecules themselves.

As discussed above, the equilibrium between the molecular attractions and the internal energy of the liquid molecules requires that liquid must occupy a certain volume of space, no more and no less. If the volume is caused to be less, molecular collision and other internal forces immediately oppose the volume decrease. The molecules exert pressure against each other and against their container until relieved through expansion back to the equilibrium volume as determined by the balance between the amount of internal energy and the molecular attractions and other forces within the liquid.

In a flowing liquid, the individual molecules themselves are the mass of the liquid and therefore are what have inertia and momentum, the collective effect of which is seen in the behavior of the liquid as a whole. As a valve in a pipeline rapidly closes, the volume equilibrium of the liquid is disrupted as the inertia of the individual liquid molecules causes the molecules to pack closer together creating increased collision forces, and thus increased pressure within the liquid and against the pipeline walls. So, it is the inertia caused packing or compression of the liquid molecules together that causes the immediate pressure rise at the valve and pressure wave front.

2. Energy Equation and Momentum Analysis

The theory that it is the internal molecular energy within a liquid that causes the immediate pressure rise at a rapidly closed valve and at the pressure wave front as it transmits upstream in the pipeline can be evaluated using the well-known general energy equation for fluids. The full energy equation for a flowing fluid expressed in dimensions of energy per unit mass is:

$$u_1 + \frac{P_1}{\rho_1} + \frac{v_1^2}{2} + gz_1 \pm E_m \pm E_H = u_2 + \frac{P_2}{\rho_2} + \frac{v_2^2}{2} + gz_2 \tag{11}$$

Where:
$u_1$=initial unavailable internal energy
$u_2$=final unavailable internal energy
$P_1$=initial pressure
$P_2$=final pressure
$\rho_1$=initial liquid density
$\rho_2$=final liquid density
$P_1/\rho_1$=initial pressure energy
$P_2/\rho_2$=final pressure energy
$v_1$=initial velocity
$v_2$=final velocity
$v_1^2/2$=initial kinetic energy
$v_2^2/2$=final kinetic energy
g=acceleration of gravity
$z_1$=initial elevation
$z_2$=final elevation
$gz_1$=initial potential gravity energy
$gz_2$=final potential gravity energy
$E_m$=energy entering or leaving the system as mechanical work
$E_H$=energy entering or leaving the system as heat flow (including friction loss)

The quantities $u_1$ and $u_2$ represent the internal energy unavailable to do work. Applying that equation to an initial condition of a liquid flowing by gravity in a steel pipeline through a downstream valve and a final condition of stopped liquid at the valve after rapid closure to evaluate the immediate transient pressure rise caused by the rapidly closing valve, it can be assumed or deduced that: (1) because of the rapid closure, the process is adiabatic—meaning no heat has time to exit or enter the system, (2) the final velocity $v_2$ is zero, and (3) the $z_1$ and $z_2$ terms can be ignored (by assuming for convenience that the pipeline and valve system are horizontal). The equation thereby reduces to:

$$u_1 + \frac{P_1}{\rho_1} + \frac{v_1^2}{2} \pm E_m = u_2 + \frac{P_2}{\rho_2}$$

Depending on how it is accomplished, rapid closure of a valve can require very little mechanical energy, or, can be accomplished by the flow of the liquid itself as in the instance of a ram pump waste valve, which easily closes from the kinetic drag forces of the flowing liquid. So, the work energy addition to the system in closing the valve is either zero (in the case or a ram pump) or very small (for most mechanically operated valves) and can be neglected and dropped from the equation as zero or negligible in assessing the cause of the pressure energy rise, $P_2$.

Further, recognizing that $v_1^2/2$ converts to $v_1^2/2$ g (g=acceleration of gravity) when the units are in feet of water commonly referred to as "head", the gravity caused quantity $v_1^2/2$ g can be shown to be very small as compared to the pressure rise, $P_2$ that occurs upon the rapid closure of the valve and the rapid stopping of the liquid flow. For example, if the initial velocity $v_1$ is equal to 1, 10, or 15 feet per second, the velocity head $v_1^2/2$ g is equal to 0.015, 1.55, and 3.49 feet of head respectively. While applying equation (2) in units of feet of head and using a reasonably representative steel pipeline pressure wave speed, $c_p$, of about 4,590 feet per second, the resulting pressure $P_2$ calculates to be 142.5, 1,425, and 2,138 feet of head respectively. Thus, since the velocity head caused by gravity represents only about a hundredth or thousandth or less of the pressure energy rise of $P_2$, the initial velocity head term $v_1^2/2$ can also be neglected as insignificant in assessing the cause of the pressure energy rise $P_2$, and the equation simplifies to:

$$u_1 + \frac{P_1}{\rho_1} = u_2 + \frac{P_2}{\rho_2} \tag{12}$$

or, rearranged:

$$\frac{P_2}{\rho_2} - \frac{P_1}{\rho_1} = u_1 - u_2$$

Thus, the change in pressure energy $(P_2/\rho_2 - P_1/\rho_1)$ is essentially equal to the change in unavailable internal energy $(u_1-u_2)$. The change in the unavailable internal energy $(u_1-u_2)$ results from the immediate inertial force caused compression or packing of the liquid molecules closer together. That molecular compression or packing concentrates the internal energy of the liquid into a smaller space upsetting the molecular equilibrium and resulting in the conversion of a part of the normally unusable non-pressure internal energy of $u_1$ into usable internal pressure energy, $P_2$. The large pressure increase $(P_2-P_1)$ in the stopped liquid thus results from the increased molecular collisions happening between other liquid molecules and against the pipeline walls. In other words, the non-pressure internal energy of $u_1$ decreases to that of $u_2$ while the pressure energy $P_1/\rho_1$ increases in essentially a like amount to the pressure energy of $P_2/\rho_2$.

Thus, the conclusion can be made, based on the above analysis applying the energy equation to the rapid closure of a valve, that the immediate large transient pressure rise caused by the rapid closing of the valve must derive in large measure from the inertia caused change in the unavailable internal energy content of the liquid. The large pressure rise is not, and cannot possibly be, due to the decrease in the kinetic energy of the uncompressed flowing water, $v_1^2/2$, which as has been shown, is but a small and insignificant fraction of the total pressure rise that occurs. Rather, it is the small volume decrease and small density increase in the liquid that upsets the molecular equilibrium of the liquid and causes powerful internal molecular energy forces to react and increase the liquid pressure. Thus, the theory does indeed appear to be correct that the inertia caused immediate compression or packing of the liquid molecules closer together causes the immediate pressure rise at the valve and at the pressure wave front.

That conclusion can be checked with the incompressible liquid momentum equation. An analysis of that equation applied to an incompressible fluid is provided herein (see Other Principles and Information). That analysis shows that the incompressible momentum of the liquid is equivalent to the gravity caused kinetic energy of the liquid and that the predicted change in pressure resulting from the momentum of the liquid is equal to the gravity caused kinetic energy quantity $v^2/2g$ expressed in units of head or feet of water. So, the gravity caused kinetic energy of the liquid, $v^2/2g$, is the entire quantity of liquid mass momentum energy available for the pressure rise $P_2-P_1$. And as shown above, for velocities of 1, 10, and 15 feet per second, and so on, that kinetic energy of 0.015, 1.55, and 3.49 feet of head respectively, is far less than the pressure energy that actually results from rapid stopping the flow, which for a steel pipe with $c_p=4,590$ feet/second, is 142.5, 1,425, and 2,138 feet of head respectively, and so on. Only when liquid molecular theory and the impulse-momentum equations of compressible flow are used, can one properly analyze and compute the pressure increases that actually occur in the rapid stopping of liquid flow.

Thus, based on both energy analysis and momentum analysis, the energy in the large initial pressure rise $P_2$ of a liquid that occurs upon the instantaneous or rapid stopping of a fluid flow, cannot possibly derive from the momentum or kinetic energy of the upstream liquid in its uncompressed state. The momentum energy of the uncompressed liquid by itself simply does not have the power to cause the compression of the downstream liquid. Rather, the inertial forces acting on the liquid molecules themselves must be concluded to be the major cause of the compression of the liquid that in turn results in the large pressure energy rise. In actuality, the inertial or momentum force caused compression of the liquid creates an internal molecular force imbalance in the liquid, and internal energy is converted to pressure energy.

In sum, in the rapid stopping or slowing of a liquid, part of the normally unusable internal molecular energy of the liquid is converted to usable pressure energy. That is a phenomenon of great importance. A process has been found that converts internal molecular energy in liquids into pressure energy. That process is dependent upon the velocity and momentum of the liquid molecules themselves immediately before stopping or slowing. That velocity and momentum or inertia is not dependent upon the energy lost in the waste flow, but rather is dependent upon the pressure and wave speed as expressed by Equation (5).

So, what is needed now is to improve the efficiency of the initiation and recovery of flow after rapid stoppage or slowing so that more internal energy is converted to pressure energy than is lost in the flow recovery process and a new energy source, liquid thermal internal energy, is available for use. How to accomplish that improvement for both the transient pressure work process and the flow recovery process is discussed below.

Dissipation of Confined Liquid Transient Pressure Energy

To improve work process energy efficiencies, it is important to first understand what relieves confined liquid transient pressures without doing work. Devices that relieve and dissipate transient pressures have been known and in use for a long time. They each work under the same basic principle—allow the liquid to expand into a larger space and the excess pressure dissipates. Understanding how and why that actually works is important to the design of systems intended to harness, rather than dissipate, transient pressure energy.

As a gas or a liquid that expands into and fills an empty container chamber, the gas or liquid does no work because no force is required for the gas or liquid to expand into the empty chamber. Rather, the gas or liquid molecules simply use more space in their random kinetic movements caused by the internal energy of the gas or liquid. For a liquid, that space is constrained by the equilibrium between the attraction forces between liquid molecules and the kinetic movements of the liquid molecules. The liquid simply expands to its equilibrium volume filling only that volume of empty space that is needed for that volume.

So, similar to a gas, the manner and process by which a transient liquid pressure is relieved significantly affects and determines the amount of work that is done while relieving that transient pressure. The work done depends on how the pressure and volume of the liquid are allowed to change through the process. Only the exact amount of work is done that is necessary to achieve the expansion of the liquid to its equilibrium volume, no more and no less. The work potential of any transient pressure energy in excess of that needed for the expansion is simply dissipated by transforming the pressure energy back into internal energy without doing work.

That phenomenon explains why increases in downstream pipe diameter or pipeline junctions with outgoing pipelines of the same or greater diameters always cause reduction and dissipation in the magnitude of a downstream transmitted pressure wave. The transient pressure wave is able to expand into more space and the pressure decreases. In so doing, the expansion causes the wave pressure energy to simply convert back into internal energy without doing work. So, conduit diameter increases and conduit tees with combined downstream conduit areas equal to or greater than that of the incoming conduit always cause a dissipation in the work potential of the transient pressure wave impulse.

Finally, the phenomenon explains why the presence of air in the conduit or system can significantly reduce the work potential and work output of a pressure transient work process and system. Because air is quite compressible while liquids are not, the liquid can easily expand and compress any air within the system doing little work in the process while allowing much of the liquid pressure energy to convert back into internal energy without doing work.

Confined Liquid Transient Energy Work Processes

As discussed above regarding dissipation of transient pressure energy, it can be concluded that the transient pressure energy, $P/\rho$, of a compressed liquid will convert back to internal energy, $u$, (see Equations (11) and (12)) when the compression is relieved unless the compressed liquid is made to do work as it expands to its equilibrium volume. Further, it can be concluded that the amount of work that is done depends entirely upon how easily the expansion is accomplished. For example, as discussed, expansion of the liquid into a confined air space does work as it compresses the air, but the air pressure raises little as compared to the large transient pressure drop experienced by the liquid as it expands to its equilibrium volume. In that case, most of the transient liquid pressure converts back to unavailable internal thermal energy in the liquid and so does little useful work in compressing the air as compared to the transient pressure energy available for doing work. The following provides discussion and analysis of several transient pressure energy work processes, when applicable, and how such processes can be made to efficiently do continuing useful work.

1. Water Hammer Work Processes

Described hereinabove is an explanation for how the transient pressure wave returning to the liquid source in a water hammer process can have more total energy than the potential energy of the liquid source. The additional energy comes from conversion of part of the internal energy of the liquid (u) into pressure energy ($P/\rho$). That is why, for that instant just before flow reverses and water flows back into the reservoir, the pipeline pressure is greater and at higher potential energy than it originally started with.

The water hammer process discussed hereinabove describes a rapidly closing valve in a pipeline that creates a series of alternating high and low transient pressures and forward and reverse flows in the pipeline commonly known as water hammer. The work performed by water hammer is in causing the alternating liquid flow and alternating flexures of the pipeline and valve walls. The transient pressure energy is thus dissipated by the flexures of the pipeline and friction with the alternating flowing liquid. If the pipeline or valve walls are not sufficiently strong or flexible the transient pressures will cause the walls to break. Many such hard lessons have been learned over the years by those who have designed, constructed, and operated pipeline systems that could not withstand water hammer pressures when they were created by rapid changes in flow. Thus, though not directly useful, work is nevertheless done on the pipeline and valve walls and on the liquid as the water hammer transient pressures dissipate.

Further, as discussed hereinabove, it is well known that the initial transient pressure rise resulting from a rapidly closed valve is directly related to the speed of a pressure wave $c_p$ (the speed of sound) in the liquid filled pipeline. In turn that speed is directly related to the rigidity or flexibility of the pipeline. The more rigid the pipeline, the greater the pressure wave speed $c_p$ and the greater the transient pressure rise, and conversely, the more flexible the pipeline, the lesser the wave speed and the lesser the transient pressure rise. Some important things can be learned from this well-known behavior.

The behavior can again be explained by analyzing the molecular forces that cause the pressure rise. In stopping a pipeline flow, a more flexible pipeline material such as PVC expands and provides more space or volume for the liquid. So, the compressed liquid volume is closer to equilibrium and the internal molecular forces exert less pressure. Whereas, a rigid pipeline expands very little. So, the momentum and inertia of the liquid molecules packs the molecules closer together in a smaller space or volume and the internal thermal kinetic forces exert greater pressure attempting to restore the equilibrium volume.

Two things can be learned from this phenomenon. The first is readily apparent—that a rigid pipeline causes the conversion of more internal energy into liquid pressure forces from the same liquid flow and so can often provide greater opportunity and efficiency for harnessing the internal energy of the flowing liquid. The second is more subtle, but just as important because it has general application. It is that more efficient designs will not dissipate the transient pressure energy by relieving it without doing useful work. Flexing a pipeline is generally not useful work and so reduces work efficiency by using and dissipating part of the available transient pressure energy that could otherwise be made to do work.

Another subtle phenomenon that occurs to dissipate transient pressure water hammer energy is what actually happens each time the wave front returns to the reservoir or water source. For that split second, as the wave front reaches pipeline inlet at the water source, the transient pressure at the inlet is much greater than the water source pressure. But at the moment the wave enters the water source, all wave pressure in excess of the water source pressure is immediately dissipated by expansion of the liquid into the water source. That expansion relieves the excess pressure and does almost no work. Though it does push a small amount of the water source liquid aside, no useful work is done and most of the excess pressure energy converts back to unavailable internal thermal energy. The only pressure that then remains at the pipeline entrance is the water source pressure itself which then causes a reversal of the pipeline flow and a pressure wave front travels back down the pipeline. But, that pressure wave is at the water source pressure and not at the much higher pressure of the wave that had just reached and entered the water source. That pressure energy is dissipated in the water hammer process back into internal molecular energy and is no longer available to do useful work.

As each succeeding pressure wave returns to the water source or reservoir, the pressure wave is smaller in magnitude due to the work done by friction and the expansion and contraction of the pipeline walls. And, in turn, each returning pressure wave is dissipated through conversion back into internal molecular energy as it enters that reservoir so that eventually, as the transient pressures are damped out and ended by friction and the work done on the pipeline walls, the only useful pressure energy that remains is the reservoir pressure.

The fact that the water hammer cycle repeats itself, though successively dampened, can be quite useful and taken advantage of in doing useful work, such as in the ram pump work process. The optimum efficiency for the operation of a given system will depend largely upon how much friction and dampening occurs in each successive cycle. Optimum efficiency should be expected when the time lost in generating another transient is offset by the increased pressure energy available from the newly generated transient versus that available from the increasingly dampened transients of the previous transient cycle set.

A work process that can increase the usable energy or useful work that can be done from water hammer involves the placement of a rapidly closing valve at the reservoir inlet to the pipeline. The valve is rapidly closed just before the first transient reaches the inlet. If timed correctly and done quickly enough, the transient pressure can be reflected from the closed valve causing a near doubling of pressure directed back toward the downstream valve and the reflected wave can be made to do useful work in a ram impulse type work process as it returns. Any remaining transient pressure waves transmitting back up the pipeline to the inlet valve can also be made to reflect back in the same manner and can also be made to do useful work.

2. Ram Impulse Confined Liquid Work Processes

Ram impulse work processes are processes that use positive transient pressures to do useful work. For example, ram pumps use positive transient pressures to pump liquid. Adaptations can harness positive transient pressures to do most any type of work as well. The ram pump process is analyzed here first followed by analysis of adaptations for doing any type of useful work.

a. Ram Pump Work Processes

As demonstrated hereinabove, the efficiency of the pumping portion of the operating cycle for a functioning ram pump is always greater than 100 percent. That is because during the pumping part of the ram pump cycle, part of the internal kinetic energy of the water has been converted to pressure energy and that pressure pumps the water to a much higher level than the elevation of the water source. Thus, the efficiency of the pumping part the ram pump cycle is much greater than 100 percent as determined by Equation (8).

The assumption to date is that the overall process must have an efficiency of less than 100 percent and so the conversion of internal energy into pressure energy is just an interesting phenomenon with only a limited application for doing work. But, it is a major assumption that has unfortunately foreclosed further inquiry. The unfortunate assumption is actually false. But, due to the inefficiencies inherent in the ram pump work process and an unfortunate focus on the overall power efficiency of a ram pump system, that fact is not at first apparent and so has been missed until now.

First, it can be shown that overall system power efficiencies of greater than 100 percent can be achieved by ram pump systems. If instead of focusing on the overall power efficiency evaluated using Equation (6), one instead evaluates the resulting net energy efficiency of the system one gets an entirely different efficiency result. The energy lost is the loss in the potential energy of the waste flow while the energy gained is the gain in potential energy of the pumped flow. The net energy efficiency is then computed by dividing the gain in potential energy by the loss in potential energy as follows:

$$E_s = \frac{P_v \times H_p \times \gamma}{W_v \times H_s \times \gamma} \tag{13}$$

where:
$E_s$=Net total system energy efficiency
$P_v$=Pumped volume (ft$^3$)
$H_p$=Resulting head of pumped flow (ft)
$W_v$=Wasted volume (ft$^3$)
$H_s$=Wasted head or source head (ft)
$\gamma$=unit weight of water (lb/ft$^3$)

The units for this equation are that of energy (ft-lbs/ft-lbs) which is dimensionally correct for computing the net energy efficiency of the overall system pumping operation (the combined net energy efficiency of the operation of the upstream drive pipeline, the ram pump unit, and the downstream discharge pipeline to its outlet). Because $\gamma$ appears both in the numerator and the denominator, it can be cancelled from the equation so that a simplified net system energy efficiency equation can be expressed as:

$$E_s = \frac{P_v \times H_p}{W_v \times H_s} \tag{14}$$

Now, let's use Equation (14) to evaluate the net energy efficiency, $E_s$, of reported higher efficiency ram pump operations. Ram pump power efficiencies, $E_p$, of up to 80 and 85 percent, computed using the traditional efficiency equation (Equation (6)) reportedly have been achieved with commercially designed ramp pumps when pump head lifts, $H_p$, are 4 to 3 times the head of the source fall $H_s$ ("Using a Hydraulic Ram to Pump Livestock Water", Livestock Water Factsheet, British Columbia Ministry of Agriculture and Lands, January 2006). Using those reported efficiencies, a drive flow of 0.1 cfs with 10 feet of drive head and 40 feet and 30 feet of pumped lift respectively, pumped flow should be 0.02 cfs and 0.02833 cfs respectively for 80 and 85 percent traditionally computed power efficiencies ($E_p$ in Equation (6)). That means in a time of one (1.0) second, pumped volumes should be 0.02 ft$^3$ and 0.02833 ft$^3$ respectively. Waste flows should be 0.08 ft$^3$ and 0.07167 ft$^3$ respectively. Substituting these values into Equation 14 yields:

$$E_s = \frac{P_v \times H_p}{W_v \times H_s} = \frac{0.02 \times 40}{0.08 \times 10} = 1.00$$

$$E_s = \frac{P_v \times H_p}{W_v \times H_s} = \frac{0.02833 \times 30}{0.71678 \times 10} = 1.18$$

Both of these energy efficiencies are 100 percent or greater showing that under the right conditions and design, traditional ram pump systems can have net energy efficiencies, $E_s$, of up to 118 percent and greater. The inventor's tests have verified ram pump efficiencies greater than 150 percent while at least one published article reports test results having nearly 200 percent energy efficiency when analyzed using Equation (14). See "Hydraulic Ram Pump", Teferi Taye, Senior Mechanical Engineer, Energy Division, Equitorial Business Group, Addis Ababa, Ethiopia, published in the *Journal of the ESME*, Vol II, No. 1, July 1998.

The problem with Equation (6) in the traditional power efficiency equation for ram pump systems is in including the pumped flow, $Q_p$, in the denominator. That is correct if one desires to evaluate the efficiency of the power imparted to the pumped flow versus the total power required to operate the system including the power required to overcome upstream and downstream pipeline friction losses. However, Equation (6) ignores the fact that the power imparted to pumped flow, $Q_p$, is converted to potential energy and can be reused. But, that is exactly what happens. Gravity is a conservative force and the pumped flow is pumped against this conservative force so that its potential energy is increased. This gravity driven potential energy can be, and normally is, reused in conveying the pumped water away from the ram pump discharge pipeline outlet. When the pumped flow, $Q_p$, is taken out of the denominator of Equation (6), then the pumped power is divided by the wasted power and the result is the same as that computed from Equation (14) because the equation then computes the net efficiency of the system power gain or loss rather than the total system power efficiency. Equation (6) is incorrect in analyzing energy efficiency because it ignores or misses the fact that the power in the pumped flow is not lost.

So, now that it has been shown the ram pump system energy efficiencies can be greater than 100 percent, it is time to examine what causes dissipation of the transient pressures in the ram pump process. The typical ram pump process design has an overall traditionally computed power efficiency ranging from 40 to 85 percent with 60 percent efficiency being common. In analyzing the inefficiencies of that pumping process, first and foremost, expansion of the compressed liquid is accomplished against the open atmosphere at the pumped water pipeline outlet. As discussed above, that design is inefficient because it allows the expansion of the liquid against free air at the outlet without doing any further useful work. Whatever pressure energy there may have been in excess of that needed to push water out of the outlet is dissipated without doing work.

The air chamber does help in somewhat reducing that dissipation of pressure energy, but only to a limited extent. Immediately before the pumping portion of the cycle, the air chamber pressure is at or very near the outlet pressure. When the waste valve closes the transient pressure predicted by Equation (1) occurs at the valve and the pressure wave begins to travel back up the drive pipeline as the inertia of the liquid molecules packs the molecules closer together. The excess pipeline pressure forces liquid through the check valve into the air chamber compressing the air in the chamber to a pressure somewhat above the outlet pressure and forcing the uncompressed water column in the outlet pipeline to move toward the outlet and discharge liquid out of the outlet. As the transient pressures in the pump and drive pipeline drop to that in the air chamber, the flow tries to reverse and the check valve closes. The excess pressure in the air chamber then forces more liquid out of the outlet until its pressure equalizes with that caused by the outlet elevation. So, the excess pressure created in the air chamber by the work of the transient pressure upon the air chamber captures and preserves a portion of the transient pressure energy (part of the internal energy), which in turn, does some additional work pushing more water out of the outlet and overall efficiency is slightly improved. But, as pointed out above, because air is easily compressible, most of the excess pressure is dissipated without doing work as it expands against the easily compressible air and process efficiency suffers accordingly.

Analysis of the waste flow portion of the cycle also reveals inefficiencies. First, as the pumping part of the cycle ends, and the check valve closes, the remaining transient pressures in the drive pipe are at the outlet pressure. That causes a back pressure and flow back up the drive pipeline to the source sufficient to relieve the pressure at the waste valve and it reopens. So, part of the transient pressure energy is used to do the useful work of reopening the waste valve. But, that work does not directly contribute to the efficiency of the overall work output of the process.

If as in some designs, the check valve is spring operated, the spring will cause the valve to close before all of the transient pressure in excess of the outlet pressure has been used in the pumping process. In that case, pump efficiency decreases. But, a spring operated valve is sometimes necessary if the pump lift is not sufficiently high as compared to the water source. In that case, there is not enough energy left to cause the back flow needed to reopen the waste valve. So, the spring operated check valve preserves some of the pumping energy for the needed reopening of the waste valve in the back surge process.

But, probably the most important inefficiency is in the waste flow portion of the cycle. First, the terms "waste flow" and "waste valve" do not properly describe their function. Rather "recovery flow" and "recovery valve" are better because the flow through the valve is necessary to restore and recover the drive pipeline velocity back to that needed for the next pumping portion of the cycle. Viewed in that manner, it becomes apparent what needs to be done to increase efficiency. The recovery to maximum or optimum flow velocity needs to happen as quickly as possible.

Testing shows that there is an optimum recovery flow velocity for ram pump operation that produces the greatest pumping flow in comparison to the amount of waste/recovery flow energy lost. Any lesser waste/recovery velocities result in lesser transient pressure energy and so less pumped flow. While for any greater waste/recovery velocities, though resulting in greater transient pressures, most of the additional transient pressures are lost or dissipated in the air chamber or through the pumped water outlet. So, wasted energy increases in the waste/recovery flow discharge while little to no additional pumping is accomplished. Thus, the pumping energy efficiency is the greatest when the waste/recovery valve closes at the optimum waste/recovery velocity for the head against which water is being pumped.

Further, another waste/recovery flow phenomenon affects the energy efficiency of ram pump operation. As was discussed hereinabove, when a valve is rapidly opened, there is an initial rapid increase in velocity. The incremental increase occurring in the flow is at first comparatively large—basically double the initial flow as the first transient low pressure reaches the reservoir. But, as each successive transient low pressure wave caused by the open valve reaches the reservoir, the magnitude of that incremental increase decreases rapidly and near asymptotically as the flow velocity nears steady state conditions.

So, at first the rapid increase in flow velocity causes a rapid increase in available pumping energy. But as the waste/recovery valve remains open, the incremental increase in velocity and associated increase in available pumping energy rapidly decreases so there becomes increasing waste/recovery flow for lesser and lesser increases in velocity and thus lesser and lesser transient pumping energy. So, quickly the increasing wasted energy begins to cause increasing loss in pumping efficiency. At the point where the energy loss just begins to exceed the energy gain, the maximum efficiency has been reached and any further waste/recovery flow decreases efficiency. In sum, the pumping efficiency suffers if the waste/recovery valve closes too early or too late.

In many cases, these various losses of efficiency do not matter because there is sufficient waste flow energy in excess of the pumping energy needed to allow ram pumps to be useful in a wide variety of applications. The inefficiencies are analyzed here to help understand the energy losses in the overall ram pumping process so that more efficient systems that can do work other than pumping of liquids can be designed.

If electricity is available, electrical opening and closing of the waste valve can greatly improve pumping efficiency by constraining the waste flow to a range of optimum efficiency. The efficiency that can be achieved in any situation depends mostly upon the drive pressure from the source and the drive pipeline length and rigidity.

In similar manner to the water hammer process, the drive pipeline length and rigidity directly determines the cycle time for hydraulically operated ram pump systems. It does so in three ways. The drive pipeline length affects: 1) the time length of a transient pressure impulse (whether high or low pressure), 2) the magnitude of the drive pipeline friction loss, and 3) the time length of energy loss through the waste valve. The drive pipeline length affects the energy loss both in terms of the magnitude of the friction loss and the time required to reach any given flow velocity in the drive pipeline and through the waste valve. The longer the length or the less rigid the pipeline, the longer time required for the velocity to increase. But, conversely, the longer the pipeline length and the lesser the pipeline rigidity, the longer the time of the transient pressure impulse available to do work. That time length is based on the momentum or "freight train" principle. The greater the mass of the liquid being either stopped or started, the longer the time that it takes to fully start or stop. And the longer time a force is applied, the greater the work that can be accomplished and thus the higher the energy efficiency. So, the energy efficiency for a given pipeline length is determined by the overall balance between the source drive pressure, the friction loss, the pipeline rigidity, the time length of the transient pressure impulse, and the time length of flow and energy loss through the waste valve.

b. Ram Piston Work Process

Figure 2A:
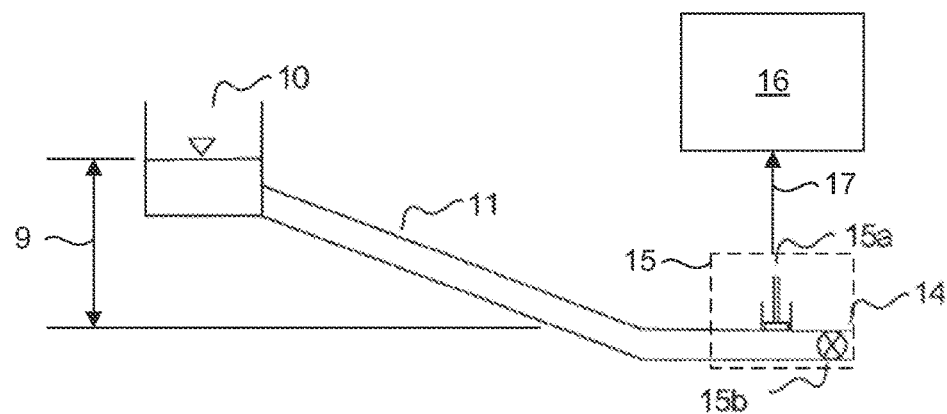
FIGS. 2A-2C are schematic diagrams of components of a transient liquid pressure power generation system, in accordance with an embodiment of the present invention.
Figure 2B:
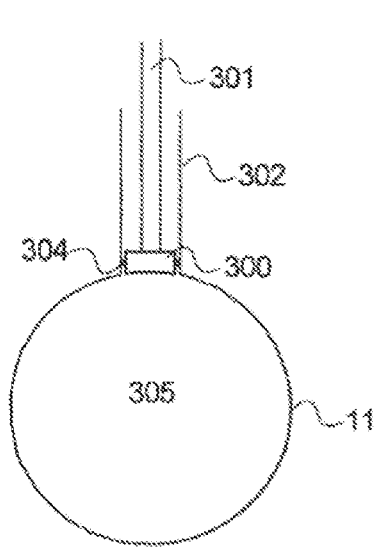
Figure 2C:
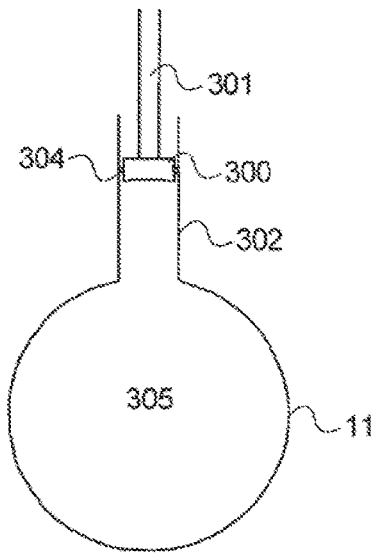

An improvement on the ram pumping work process is to replace the check valve, air chamber, and outlet pipeline with a piston in a cylinder connected to the drive pipeline as shown in FIGS. 2A-2C. The opposite end of the cylinder is open to the atmosphere. The piston is sealed against the cylinder walls so that no liquid can escape to the open side of the cylinder and drives a piston rod connected to any useful device that can be driven by the reciprocating motion of the piston.

This design can reduce or eliminate the inefficiency of dissipating excess pressure energy to the atmosphere at the pump discharge line outlet, but requires that the load on the piston must be sufficient to avoid dissipating the energy as well. The size of the piston matters as well and needs to be balanced against the source pressure and volume and length of the liquid in the drive pipeline. Otherwise, source pressure and pipeline length affect the energy efficiency of the work process in the same manner as in the ram pump system.

The operation is much like that of a ram pump, but with some important differences. Like the ram pump operation, a flow recovery/waste valve opens and begins to discharge liquid. As the liquid accelerates and velocity begins to stabilize, the flow/recovery waste valve shuts stopping the flow. The resulting pressure transient pushes the piston outward in the cylinder doing work upon whatever is connected to it. As the transient pressures drop, the load on the piston is sufficiently maintained such that it has sufficient power and force to push the liquid back out of the cylinder at normal pressure and the piston returns to its original position in close proximity to the drive pipeline. The pushing of the liquid out of the cylinder creates a reverse flow back up the pipeline to the source. As the piston reaches its original position and stops, the reverse flow continues for a moment under its own momentum. That moment of reverse flow causes the pressure to drop at the flow recovery/waste valve causing it to reopen and the cycle begins again.

Again as with a ram pump, replacing the hydraulically operating valve with an electronically controlled flow recovery/waste valve can enhance operating efficiency by maintaining recovery flow at its optimal minimum. In that case, the stroke of the piston and the piston size is balanced against the cylinder volume, the drive pipeline length and volume, and the drive pipeline normal pressure to achieve the greatest overall piston work efficiency. The back flow becomes unnecessary to open the recovery flow valve, and so can be minimized or eliminated. But, if the cylinder liquid is exhausted through the recovery flow valve by the opening of the recovery valve on the down stroke, whatever flow is discharged from the cylinder prevents or reduces velocity in the drive pipeline for the next cycle and so reduces efficiency unless kept to a minimum.

With the exception of the return discharge of liquid from the cylinder back to the pipeline, the ram piston system alleviates most of the inefficiency of a ram pump system. In so doing, overall system efficiencies much greater than 100 percent are possible because again, it is not the energy of the recovery/waste flow that causes the transient pressures, but the inertia of the liquid molecules in the drive pipeline.

c. Ram Turbine Work Process

Figure 3A:
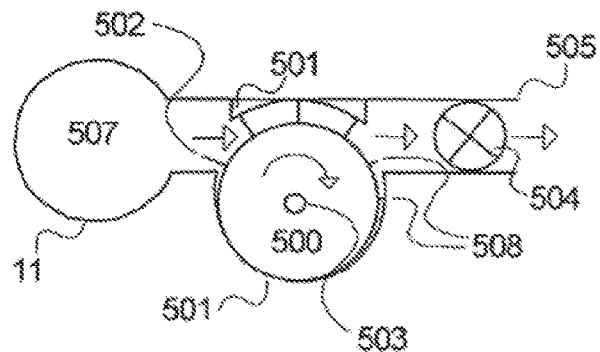
FIGS. 3A-3C are schematic diagrams of components of a transient liquid pressure power generation system, in accordance with another embodiment of the present invention.
Figure 3B:
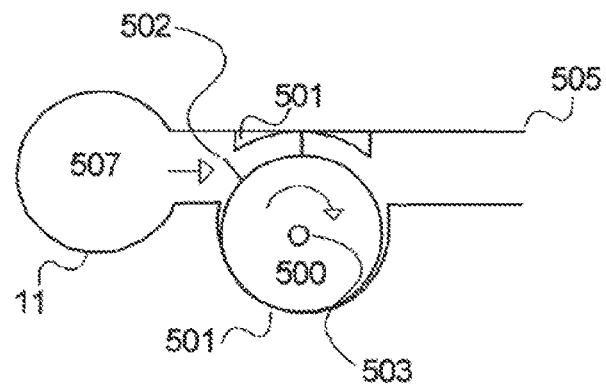
Figure 3C:
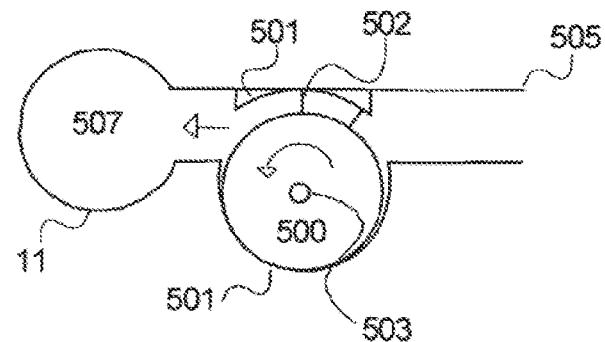

A ram turbine work process functions basically the same as a ram piston work process with the piston and cylinder assembly replaced by a turbine assembly. Two basic types of ram turbines are the rocker-type turbine and the flow-through turbine. A diagram of the rocker-type turbine is shown in FIGS. 3A-3C. One or more of the blades are initially in close proximity to the flowing liquid in the drive pipeline. As a transient positive pressure is caused by any means in the pipeline, the turbine blades are driven in the sealed turbine housing away from the drive pipeline. As the positive transient pressures end, the rotation of the turbine is reversed and the turbine is rotated back by any means to its original position with its blade or blades again in close proximity to the drive pipeline for the next positive transient pressure. Thus, the motion of the turbine is a rocker-type back and forth motion which drives by any means any device connected to it in a reciprocating fashion much like the ram piston work process.

For the flow-through ram turbine, an outlet with a check valve is added on the downstream side of the turbine as shown in FIG. 3A that outlets to any suitable location or pipeline and the turbine is operated to rotate in a full circle. The turbine blades retract or fold over on the outlet side so that upon the production of positive transient pressure in the drive pipeline, the transient pressurized liquid is discharged through the turbine and out through the check valve causing the turbine to rotate and do useful work upon any device connected to it.

3. Downstream Momentum Confined Liquid Work Process

In a downstream momentum work process, upstream flow is quickly slowed or interrupted in a pipeline by any means. The momentum of the downstream liquid causes the liquid to continue moving exerting a low pressure, or suction pressure, on the upstream side of the liquid column where the flow has been slowed or stopped. That low, or suction pressure, continues to drop until either: (1) vapor pressure is reached, (2) the downstream liquid column is stopped by friction and upstream and downstream pressure differences, or (3) the downstream liquid column vacates the pipeline through a downstream exit.

If the drop of pressure at the initial point of velocity change is sufficient to reach vapor pressure, the water column ruptures, the pressure stabilizes at vapor pressure, and a vapor cavity forms and grows until the downstream liquid stops or exits from the pipeline. Thus, for this work process the minimum low pressure that can be exerted is that of vapor pressure.

So, this work process has some limitations and is less versatile. However, the process can still be quite useful. It can be used to exert a low, or suction pressure, to move a piston, turbine, or any useful device, or to pull liquid into a pipeline, container, or reservoir. It can also be used to take pressure off of a device so that it can be easily moved or opened similar to the re-opening work action of reverse flow on a ram pump waste valve.

Finally, if a vapor cavity is formed and flow is able to reverse due to upstream or downstream pressure conditions, the reverse liquid flow and pressure that travels back toward the vapor cavity causes the cavity to collapse. At the moment of complete collapse, a positive pressure transient equal to equations (1) or (2) is generated that will travel back up the pressure conduit and can be used to do work in a ram impulse or other such work process.

But, again if the flow does not reverse, the momentum force of the flowing liquid column remains available for doing work until it comes to rest. If the water column does not rupture, the effect of momentum force must be evaluated using the compressible liquid impulse momentum equation: $P_i = -\rho c_p v$; the minus sign denoting a reduction in pressure. If the water column does rupture so that a vapor cavity forms in the pressure conduit and begins to grow, the motion and momentum of the remaining water column in the pressure conduit acts as rigid body motion and can be evaluated using incompressible liquid flow equations.

The total available energy for doing work using the separated water column momentum is equal to the kinetic energy, $\rho v^2/2$ or $v^2/2\,g$, plus the vapor pressure $P_v$ force energy, minus friction and any other energy losses that might apply. The friction loss can be evaluated using the well-known Darcy-Weisbach equation or other acceptable liquid flow friction loss equations. The general equations for evaluating work done are:

Available Work Energy Head (ft)=$(v^2/2g + P_v/\gamma - $friction loss (ft)$-$Other losses (ft))

where $\gamma$=unit weight of water=62.4 lbs/ft$^3$ or

Available Work Energy (ft-lbs)=$m\,(v^2/2 + P_v/\rho - $friction loss (ft-lbs)$-$Other losses (ft-lbs))

where m=total mass of water remaining water column.

4. Work Processes for Increasing Confined Liquid Transient Pressure Energy

Several confined liquid work processes are available for enhancing and increasing the transient pressure energy available for use in conjunction with other transient pressure work processes.

a. Passive Confined Liquid Work Processes for Increasing Pressure Energy.

Passive confined liquid work processes are processes that do not require additional outside actions once a transient pressure wave has been generated to convert internal energy to pressure energy or vice versa. Rather passive work processes take advantage of changes in the physical configuration and properties of a conduit system to convert internal energy into increased pressure energy.

For example, as discussed herein, a traveling transient pressure wave impulse that encounters a dead-end or closed valve at the end of the main or lateral conduit can double the pressure of the reflected wave. Thus, reflection of transient pressure waves at a dead-end or closed valve can dramatically increase the conversion of internal energy into higher pressure having dramatically higher work energy potential for use in transient pressure work process and production devices.

Other passive confined liquid work processes that convert additional internal energy into pressure energy include a decrease in conduit diameter or area, or an increase in conduit wave speed, or both. Internal energy is converted into a higher pressure wave impulse as the wave impulse transmits through and into a diameter or area decrease or into a more downstream rigid conduit with a higher wave speed downstream. Likewise, a conduit tee with downstream conduits of combined area less that the incoming wave impulse conduit or of greater wave speed also convert the transmitted wave to a higher pressure impulse. Thus, simply decreasing the downstream conduit diameters or areas, or increasing the downstream conduit wave speeds, converts more of the internal energy of the downstream liquid into pressure energy that then can be made to do work on work production devices.

However, the converse is true with reflected wave and returning wave impulses as they return and pass back out of the downstream conduit into the upstream conduit. This fact does not matter for work processes that do not depend upon repetitive wave impulses acting upon work producing device. But, even for work processes that do depend upon repetitive wave impulses, the net effect can still be positive depending upon the nature and timing of the impulses returning into the upstream pipeline because return impulses are additive to the pressure already present in the upstream conduit at the time of each impulse wave return to the upstream conduit. With good design, the pressure in the upstream conduit can be increased by wave impulse reflections back from the diameter or other conduit change or from reflections at the upstream end of the upstream conduit.

b. Valve Closing Confined Liquid Work Process

In this process, the closing or partial closing of valve either upstream or downstream can be used to prevent pressure energy dissipation and to convert additional internal energy into pressure energy. The full closing of the valve at the right time can create a reflection and doubling of the wave impulse in the reverse direction while preventing transmission of the wave impulse through the valve where it might otherwise dissipate into a supply reservoir or other system conduit or component.

Or, a diameter change at the right moment can cause an increase in pressure in the transmitted wave just upstream of a ram piston, ram turbine or other transient pressure work process device, or can cause a partial reflection of the wave impulse in the reverse direction increasing pressure in the reverse direction.

c. Zero Initial Velocity Confined Liquid Compression Work Processes for Increasing Pressure Energy.

At least two processes are available for converting liquid internal energy into pressure energy for doing transient pressure wave impulse work that do not require the liquid to be initially in motion to cause that conversion. These processes include piston or mechanical compression and liquid injection compression.

(1) Piston or Mechanical Liquid Compression Work Process

In this process, a conduit or vessel having a piston or similar mechanical device at one end or at the end of a connected liquid filled lateral pressure conduit line is filled entirely with lower pressure liquid and closed at both ends so that the conduit or vessel and piston confines the liquid. Force is then applied to the piston or mechanical device causing it to move toward the liquid filled and confined conduit space and thus pressurize the liquid filling the vessel or conduit. The pressurized liquid can then be released into a downstream liquid filled pressure conduit or vessel to cause a transient pressure wave impulse or set of transient pressure wave impulses in the entire liquid filled system. If the surface area of piston or other mechanical device is small compared to the force applied to it, high pressures are created in the liquid with little work or required energy in comparison to the work accomplished when the pressurized liquid is released and made to drive a transient pressure work production process.

(2) Liquid Injection Liquid Compression Work Process

In this process, relatively low pressure liquid is introduced through a valve into a closed conduit or vessel until the conduit or vessel is filled. The low pressure liquid valve is then closed so that the liquid is confined in the conduit or vessel. Pressurized liquid or liquid at a higher pressure, is then forced by liquid pressure into the conduit or vessel through a second valve that is opened until all of the liquid in the conduit or vessel to a pressurized to a desired pressure. The pressurized liquid valve is then closed. The pressurized liquid in the vessel or conduit can then be released into a downstream liquid filled pressure conduit or vessel to cause a transient pressure wave impulse or set of transient pressure wave impulses in the entire liquid filled system. This transient pressure wave impulse or set of impulses can then be made to do work in a transient pressure work device process. The work and energy that can be produced in the transient pressure work process, can be significantly greater than the work and energy required to fill the conduit or vessel with low pressure liquid and to pressurize that liquid by introducing pressurized liquid into the conduit or vessel.

Referring again to FIG. 1, the liquid flow volume within a transient pressure producing cycle of the system 1 can be minimized for achieving minimum energy loss while doing the useful work desired. The work efficiency is a function of the amount of work/energy expended versus the amount of work done on the device 16. The energy expended is directly related to the volume of liquid flow that passes through the transient pressure drive 15 from the time the flow first starts (or first begins to increase) in the pressure drive component 15 from the liquid source 10 and through the drive conduit 11 to the time the flow is stopped (or slowed) by the transient pressure drive device 15 to produce high transient pressures. The velocity of that flow increases near asymptotically toward the steady state velocity. At first the flow velocity through the transient pressure drive device 15 increases rapidly to near the steady state velocity with the remaining velocity increase toward the steady state velocity occurring more gradually over a comparative much longer period of time. Meanwhile, energy is expended to cause the liquid flow from the liquid source 10 through the drive conduit 11 and the transient pressure drive device 15. Since the magnitude of a transient pressure resulting from the stopping (or slowing) of a liquid by the transient pressure drive device 15 depends on the magnitude of the liquid flow velocity through the device 15, the greatest transient pressure work process efficiency is achieved if the flow is stopped (or slowed) by the transient pressure drive device 15 after the rapid increase in velocity while flow volume through the transient pressure drive device 15 is low compared to the flow velocity that is reached. Allowing the flow through the transient pressure drive device 15 to continue thereafter decreases work efficiency because the flowing liquid expends energy while achieving little comparative gain in the amount of work that can be done by transient pressures and the transient pressure drive device 15 when the liquid flow is stopped (or slowed).

In one aspect, the process of the system can entail the coordination of the hydraulics, design, and operations of the liquid source 10, the drive conduit 11, and transient pressure drive device 15 components to minimize the liquid flow volume flowing in the pressure drive conduit/source conveyance component 11 and through the pressure drive device component 15 during a transient pressure producing cycle while attaining a maximum flow velocity within an optimum range for producing the liquid pressure transients within the two components (11 and 15) that optimum range being the velocity range wherein any lower maximum velocity or any higher maximum velocity appreciably reduces the work/energy efficiency of the transient pressure drive device component 15 in doing work on the device 16 from that work efficiency achieved by the transient pressure drive device component 15 when maximum flow velocity is within the optimum range. The process can thus result in optimum useful work being done by the pressure drive device 15 at an optimally minimized energy and liquid loss from the flow of the liquid through the pressure drive conduit 11 and the transient pressure drive device 15. The optimum work/energy and liquid efficiency range can be found for any system through testing, and can be estimated through computations of the cycle work done versus the cycle flow volume and cycle energy used (energy lost) in reaching various pressure drive conduit maximum flow velocities. In one aspect, the process of FIG. 1 can be more efficiently done using the zero initial velocity work process described hereinabove.

The process work/energy efficiency is computed by dividing the work done by the transient pressure drive device 15 on the device 16 by the overall energy lost from the release of liquid from the liquid source component 10 through the pressure drive conduit 11 and through the transient pressure drive device 15 into the outflow conduit 14. For a return system, the energy used or lost (such as friction loss) in passing the liquid through the outflow conveyance component 14, the heat source 13, and returning the liquid through the liquid return conduit 12 is also included in the energy used or lost. The process liquid efficiency is evaluated by dividing the volume of liquid that is returned by the return conduit 12 to the liquid source component 10 during any selected period of time by the volume of liquid that is supplied from the liquid source component 10 during the same period of time.

As illustrated in FIGS. 2A-12, systems in accordance with the present disclosure can include various configurations of transient pressure drive devices, drive components, and/or other system components. For example, as shown in FIGS. 2A-2C, a system can, in some aspects, resemble a typical "ram pump" in which liquid is gravity fed at a vertical height difference 9 to the transient pressure drive device 15 from the liquid source 10. The embodiment shown, however, includes a transient pressure drive device component 15 with a drive component 15a comprising a "ram piston," and a transient pressure producing outflow valve unit 15b, which can provide higher efficiency for a typical "ram piston."

In operation, the outflow valve unit 15b is opened causing liquid to flow from the liquid source component 10 through the pressure drive conduit component 11, the outflow valve 15b, either discharging directly to the surroundings through the outflow valve 15b, or discharging into the conduit 14. The liquid flow velocity increases in the conduit 11 and the outflow valve 15b until the force of the flow through the outflow valve 15b causes the outflow valve 15b to quickly close. The sudden closing of the outflow valve 15b causes high liquid transients that drive the ram piston of the drive unit 15a outward, which in turn drives, and does work upon, the device 16 to the drive unit 15a. The ram piston of the drive unit 15a is returned to its original position (FIG. 2B) by gravity, mechanical, or other means.

The "ram piston" is shown in more detail in FIGS. 2B and 2C. For example, as shown, a piston 300 and piston rod 301 are mounted in a cylinder 302 connected to the flow path 305 and the conduit 11. The cylinder 302 can be constructed so as to have low, or atmospheric, pressure on the opposite side of the piston 300 from the conduit 11 and the piston 300 can have seals 304 that contact the cylinder wall 302 and prevent leakage of liquid from the conduit 11 past the piston 300 to its low pressure side. In FIG. 2B, the piston 300 is positioned at an initial position prior to a transient pressure being produced in the conduit 11. The piston may be most efficient when it is in close proximity and/or adjacent to the liquid flow path 305, as shown. As transient pressure is produced by the closing of the outflow valve 15b and thereby stopping the liquid flow, the transient pressure pushes the piston 300 and piston rod 301 outward and away from the conduit 11 within the cylinder 302 toward its low pressure side, as shown in FIG. 2C, driving and doing work upon the device 16 driven by it. As the transient pressures end, the piston 300 is returned by gravity, mechanical, or other means to its original position (FIG. 2B) near the conduit 11 so that the piston 300 is ready to be again driven by the next transient pressure produced.

The liquid that enters the cylinder 302 is pushed back out by the returning piston 300 and back up the conduit 11 into the liquid source 10. As the piston stops pushing the liquid backwards back up the conduit 11 and back to the liquid source 10, the momentum of the backward liquid flow relieves the pressure against the outflow valve 15b and it reopens, thus beginning the cycle again.

In one aspect, the piston 300 can be stopped by any means while the liquid that is entering the cylinder 302 from the conduit 11 as the piston 300 moves away from the conduit 11 has sufficient remaining momentum to cause a second pressure transient in the cycle. That second pressure transient can travel back up the pressure drive conduit to the liquid source and cause a backward flow in the pressure conduit 11 to the liquid source. The momentum of the backward flow can relieve the pressure against the outflow valve 15b so that the outflow valve 15b can reopen and starts the cycle again. In another aspect, the "ram piston" drive unit 15a can be operable with any transient pressure producing valve or element 15b, such as any quick operating mechanically or electrically operated valve or other quick moving valves or devices that produce repeating and cyclic transient pressures.

In addition, the work load of the device 16 directly or indirectly driven by the piston 300 and piston rod 301 can be maximized and matched with the piston 300 travel distance within the cylinder (the piston stroke or the distance the piston 300 travels between the piston positions in FIGS. 2B and 2C) to produce maximum work while requiring minimum piston 300 travel distance (the piston 300 movement distance between positions FIG. 2B and FIG. 2C) and expulsion of liquid back out of the cylinder 302 during the return stroke of the piston 300 as it returns to its original position (FIG. 2B). Minimizing the amount of liquid that needs to be expelled from the piston cylinder 302 back into the conduit 11 and pressure drive conduit flow path 305 on the return stroke by maximizing the device 16 work load can increase energy and liquid efficiencies. It can do so, for example, by reducing and minimizing the volume of flow required to reach the desired flow velocity for producing the next set of pressure transients in the next cycle.

Finally, it should be noted here that the larger the piston, the greater the work that can be done. However, a large cylinder can act as a sudden enlargement and reduce pressure waves coming into the cylinder. So, the piston size needs to be balanced against the pressure wave reductions that occur. Further, the piston should be as close as possible to the wall of the conduit so the initial largest pressure waves act with little to no reduction. Thereafter, a large cylinder with a smaller entrance acts as a resonance chamber and can do more work if properly designed.

FIGS. 3A-3C illustrate other embodiments of a drive component, in accordance with the present disclosure. In these embodiments, the drive component can comprise a "ram turbine," which can be utilized in the system illustrated in FIG. 1 or substituted for the ram piston of FIGS. 2A-2C. In this embodiment, the ram turbine drive component can comprise an enclosed vane-type turbine 500 mounted in close proximity and adjacent to the conduit 11 flow path 507 and sealed against the sealed housing 501 such that leakage of liquid past or through the turbine 500 and turbine 502 is minimized or prevented. As transient pressures are repeatedly and cyclically produced in the conduit 11 by stopping or substantially slowing the liquid flow, the transient pressure pushes one or more of the turbine vanes 502 away from the pressure drive conduit flow path 507 thereby turning the turbine 500 and drive shaft 503 doing work on any device/thing driven by the drive shaft 503 while expelling liquid under lower pressure through an optional outlet 505 and outlet check valve 504 connected to the downstream or low pressure side of the turbine housing 501. The liquid is expelled through the optional check valve 504 and outlet 505 as the turbine turns and the vanes retract 508 within or bend down against the turbine body 500 to fit within and seal against the sealed turbine housing 501. Each retracted or bent over vane 508 remains retracted within or bent against the turbine body 500 until it has rotated around to the conduit 11 side of the turbine where the vane 502 is caused any means to again extend out and away from the turbine body 500 to be ready to be driven by the next transient pressure.

As the transient pressures become sufficiently dissipated by doing work pushing the turbine vanes 502, the optional outlet check valve 504 can close and the turbine 500 can stop. In one aspect, the outlet check valve 504 can be set or designed to close prior to full transient pressure dissipation through pushing the turbine. In another aspect, without the check valve 504, the transient pressure can continue to turn the turbine body 500 and drive shaft 503 until the transient pressures no longer have sufficient strength to turn the turbine 500 and drive shaft 503. At that time, whatever transient pressures are left can be quickly dissipated in the conduit 11.

When the next pressure transient set is produced in the conduit 11, the drive vanes 502 are again driven away from the conduit 11 flow path 507 turning the turbine 500 and drive shaft 503 while the optional outlet check valve 504 again opens and allows liquid to expel from the turbine 500 and its vanes 502. The turbine 500 inlet, outlet, and outlet check valve 504 can be constructed at any location around the circumference of the turbine so that the locations are not limited to that shown in FIG. 3A, but can be constructed in any suitable location for the particular application.

The ram turbine can also be made to function as a substitution for the ram piston of FIG. 2A in the following ways. In one aspect, if the optional check valve 504 is used, the check valve can be set or designed to close at a high enough pressure to stop the flow through the turbine and cause transient pressure backflow back up the conduit 11 that will relieve the pressure on the outflow valve 15b and cause the outflow valve to reopen and begin a new cycle. In another aspect, the turbine 500 can be suddenly stopped by any means so that remaining transient pressures will cause backflow back up the conduit 11 to relieve the pressure on the outflow valve 15b and cause the outflow valve to reopen and begin a new cycle.

FIGS. 3B and 3C illustrate an embodiment of a rocker-type ram turbine, which can be utilized in the system illustrated in FIG. 1 or substituted for the ram piston of FIGS. 2A-2C. In FIG. 3B, an enclosed vane/rocker-type turbine 500 can be mounted in close proximity and adjacent to the conduit 11 flow path 507 and sealed against the sealed housing 501 such that leakage of liquid past or through the turbine 500 and turbine 502 is minimized or prevented. As transient pressures are produced by stopping or substantially slowing the conduit 11 liquid flow, the transient pressure pushes one or more of the drive vanes 502 away from the drive conduit flow path 507, thereby turning the turbine 500 and drive shaft 503 to the position shown in FIG. 3C and doing work on a device driven by the drive shaft 503 as it turns. As the transient pressures become dissipated by doing work pushing the turbine vanes 502 and rotating the turbine 500 and turbine drive shaft 503, the work load on the turbine drive shaft 503 from the device being driven eventually causes the turbine 500 to stop at the position of FIG. 3C. The rotation direction of the turbine 500, vane 502, and drive shaft 503 is then reversed by any means (gravity, mechanical, electrical, or other means) in a rocker-type return motion that returns the turbine and vanes back to the original position near the conduit 11, without the drive shaft 503 device work load, to be ready to be driven by the next transient pressure (the position of FIG. 3B). The reverse rotation of the turbine and vanes (from the position of FIG. 3C back to the position of FIG. 3B) expels the liquid that pushed the vanes 502 back into the conduit 11 and the cycle is ready to begin again. Though liquid must be expelled by the turbine vanes 503 to the drive conduit flow path 507, the return rotation from the position of FIG. 3C to the position of FIG. 3B requires less work because no device work load is applied to, or driven by, the drive shaft 503 during the return.

In this process, the work load of the device directly or indirectly driven by the ram turbine drive shaft 503 can be maximized and matched with vane 502 travel distance to produce maximum work while requiring minimum expulsion of liquid back out of the turbine housing 501 into the conduit 11 during the return rotation of the ram turbine assembly (500, 502, 503) as it returns to its original position (FIG. 3B). Minimizing the amount of liquid that needs to be expelled back into the drive conduit 11 and drive conduit flow path 507 on the return rotation can increase energy and liquid efficiencies because it can reduce and minimize the volume of flow required to reach the desired maximum conduit 11 flow velocity in the drive conduit flow path 507 for producing the next set of pressure transients in the next cycle.

The rocker-type embodiment of the ram turbine can also be made to function as a substitute of the ram piston 15a of FIG. 2A. The rocker-type ram turbine can hydraulically function in a similar way as described for the ram piston 15a and can operate in similar reciprocating back and forth action. That action alternately receives transient pressurized liquid into the turbine housing 501 while doing work and expels pressure dissipated liquid back to the conduit 11 in reciprocal motion to and from the positions of FIGS. 3B and 3C in like manner to the ram piston 15a reciprocal processes. In addition, that reciprocal return motion pushing liquid back into the conduit from the rocker-type ram turbine can also cause the backflow that opens the outflow valve 15b of FIG. 2A, as well.

Although FIGS. 2A-3C illustrate specific embodiments of transient wave producing elements or devices, it should be recognized that any suitable transient wave producing element or device in accordance with the present disclosure can be included or substituted for the transient wave producing elements or devices illustrated in these figures.

Figure 4:
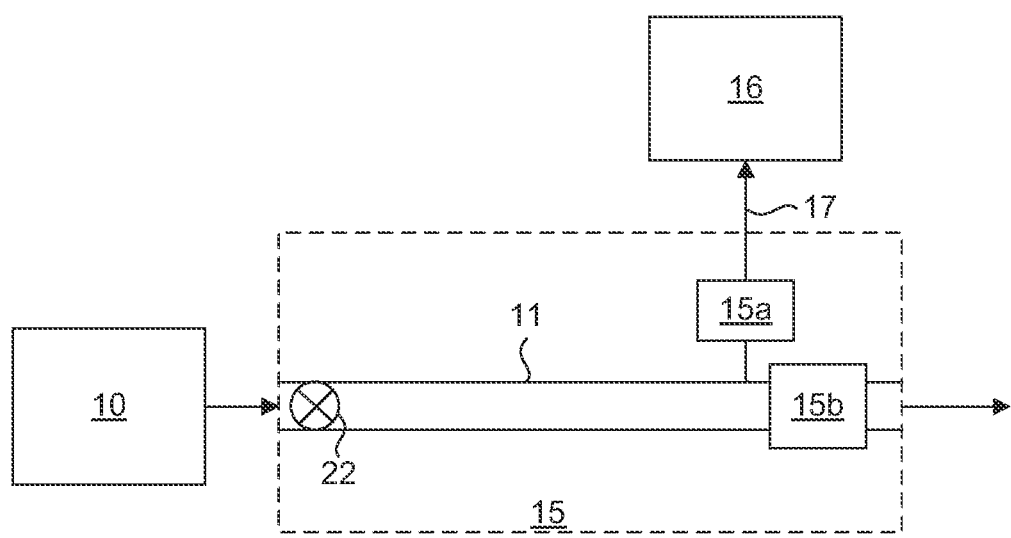
FIG. 4 is a schematic diagram of components of a transient liquid pressure power generation system, in accordance with an embodiment of the present invention.

FIG. 4 illustrates another embodiment of a transient pressure drive device in accordance with the present disclosure that can be operable with the system of FIG. 1. As shown in FIG. 4, the transient pressure drive device 15 can comprise a liquid conduit, such as the drive conduit 11, fluidly coupled to the liquid source 10, and configured such that high pressure transient wave travels through the liquid conduit toward the liquid source. The liquid or drive conduit 11 can be operable to fluidly couple the transient drive device 15, and components thereof, with the liquid source 10. As with some other embodiments, this embodiment of the transient pressure drive device comprises a transient pressure producing element, such as a valve 22, to cause the high pressure transient wave. In this case, the valve 22 is disposed in the liquid conduit 21 proximate the liquid source.

To begin a cycle, the quick acting check or control valve at the upstream end of the drive conduit 11 is at first open to allow flow from the source 10 down the drive conduit to the pressure drive device 15 where the flow is discharged from the drive conduit. When the desired velocity is achieved in the liquid flow, the transient pressure drive device stops the flow or otherwise causes a high pressure transient wave that travels back up the drive pipe at the speed of sound toward the source. Immediately before or at the time the high pressure wave reaches the one-way check or control valve at the upstream end of the drive conduit, the valve is caused to close either automatically from the high pressure or by electrical or mechanical control. The high pressure wave is then reflected by the closed valve causing a doubling of the pressure as it is reflected and travels back down the drive conduit to the pressure drive device where it drives or moves a mechanical device.

The driving of the mechanical device relieves the pressure at the device and a low pressure wave is generated that travels back up the drive conduit at the speed of sound toward the source. Immediately before or at the time the low pressure wave reaches the one-way check or control valve at the upstream end, the check or control valve automatically opens by the low pressure or is electrically or mechanically opened so that liquid from the source is caused by its somewhat higher pressure to flow through the valve and down the drive conduit.

This liquid flow and somewhat higher source pressure wave then travels back down the drive conduit to the pressure drive device where because the pressure is insufficient to drive the device the flow is again stopped and a new but somewhat reduced high pressure transient wave is generated that drives the device and travels back up the drive conduit and the liquid hammer or water hammer cycle repeats itself with the check or control valve alternately closing to reflect the high pressure transient waves back down the drive conduit to the drive device and opening to allow liquid into the drive conduit immediately before or at the time the low pressure waves return to the check or control valve.

When the energy of the water hammer has been sufficiently dissipated by doing work and by friction so that it can no longer drive the drive device, the check or control valve at the upstream end automatically opens or is opened electrically or mechanically and liquid then again freely flows down the drive conduit to the drive device starting another cycle where the liquid is discharged from the drive conduit until the desired velocity is again achieved and the transient pressure drive stops the flow or otherwise causes another high transient pressure wave to travel back up the pipe.

Figure 5:
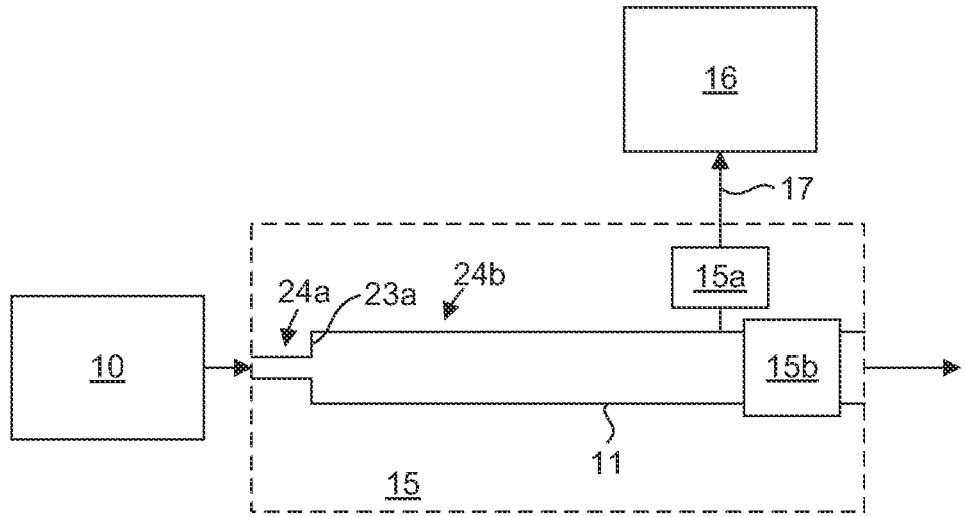
FIG. 5 is a schematic diagram of components of a transient liquid pressure power generation system, in accordance with an embodiment of the present invention.

FIG. 5 illustrates still another embodiment of a transient pressure drive device in accordance with the present disclosure that can be operable with the system of FIG. 1. As shown in FIG. 5, the liquid conduit 11 can comprise a transition surface 23a, between a cross-sectional area 24a and a cross-sectional area 24b, operable to reflect at least a portion of a transient pressure wave in the liquid traveling through the liquid conduit. In particular, the transition surface illustrated is configured to reflect the transient pressure wave in a direction of fluid flow from the liquid source or toward the drive component.

In one aspect, the transition surface can be located in the upper one-third of the drive conduit 11. When high pressure transient liquid or water hammer waves created in the drive conduit travel backwards up the drive conduit, the high pressure waves encounter or impinge upon the sudden reduction in drive conduit diameter or area. The sudden reduction in area causes an immediate pressure increase that then travels as two new higher pressure waves in both directions. One higher pressure wave travels back up the smaller diameter conduit to the source and while the other higher pressure wave travels back down the larger diameter drive conduit to the pressure drive device where increased work is done by the higher pressure. The magnitude of the pressure increase at the sudden reduction is given by the following well known and tested equation:

$$\text{Pressure change} = 2A_2/(A_1+A_2)*\text{incoming pressure}$$

Where
$A_1$=incoming (larger conduit) cross sectional area
$A_2$=outgoing (smaller conduit) cross sectional area The subsequent reverse returning pressure wave from the source travels down the smaller diameter portion of the drive conduit to the beginning of the larger diameter conduit. The returning pressure wave encounters the diameter change at the beginning of the larger diameter conduit as a sudden enlargement that causes a drop in the pressure wave as it travels down the larger diameter drive conduit. However, the sudden pressure drop causes additional liquid to flow from the upstream smaller diameter conduit so that the mass flow rate of the preceding pressure wave in the large conduit is nearly restored but moving in the other direction back down the larger drive conduit. When that wave reaches the drive device, another high pressure transient wave is created that drives the device and sends a higher pressure transient back up the larger diameter portion of the drive conduit and the process repeats until damped out by friction and other losses.

The net result is greater work is done by each higher transient pressure wave that is reflected from the sudden reduction back down the larger diameter conduit to the drive device. The process repeats until the water or liquid hammer elastic energy is dissipated by friction, doing work, and other energy losses.

A sudden reduction in the upstream portion of the drive conduit has the disadvantage of not causing as large of a pressure rise as is possible if the high pressure waves were fully reflected from a closed valve. But, it has the advantage of automatically causing higher pressure reflection waves without any moving parts or valves needing to be operated quickly, without needing energy for operation, and without needing maintenance. Particularly sudden reductions can be more advantageous in larger diameter systems where larger diameter valves have slower reaction times that require much longer drive pipes.

Figure 6:
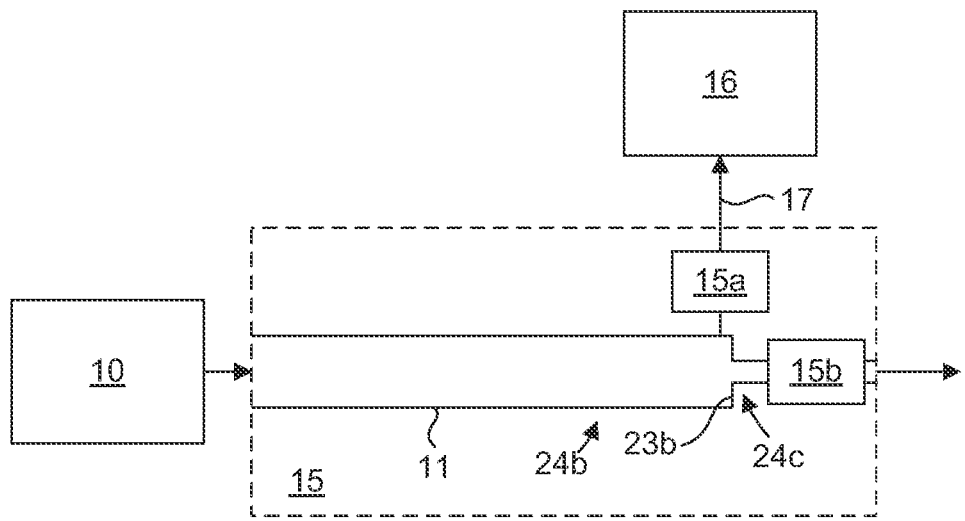
FIG. 6 is a schematic diagram of components of a transient liquid pressure power generation system, in accordance with an embodiment of the present invention.

FIG. 6 illustrates another embodiment of a transient pressure drive device in accordance with the present disclosure that can be operable with the system of FIG. 1. The transient pressure device of FIG. 6 is similar in many respects to the transient pressure device of FIG. 5, in that the transient pressure drive device can comprise a transition surface. In this case, the conduit 11 can include a transition surface 23b, between a cross-sectional area 24b and a cross-sectional area 24c, is operable to increase the pressure and transmit and reflect at least a portion of a transient pressure wave in the liquid traveling through the liquid conduit. In particular, the transition surface illustrated is configured to increase the pressure in the direction of flow and reflect the transient pressure wave in a direction opposite of fluid flow from the liquid source or away from the drive component 15a.

A sudden reduction in the downstream portion of the drive conduit functions in nearly the same way as a transition surface in the upstream portion of the drive conduit, except it is the pressure waves transmitted through the sudden reduction into the downstream smaller diameter drive conduit that do more work at the drive device.

When high pressure transient liquid or water hammer waves created in the drive conduit travel down the drive conduit, the high pressure waves encounter or impinge upon the sudden reduction in drive conduit diameter or area. The sudden reduction in area causes an immediate pressure increase in each high pressure wave that simultaneously travels in both directions. One higher pressure wave travels back up the larger diameter conduit to the source and while the other higher pressure wave travels on through the reduction and down the smaller diameter drive conduit to the pressure drive device where increased work is done by the higher pressure The magnitude of the pressure increase at the sudden reduction is again given by the following well known and tested equation:

Pressure change=$2A_2/(A_1+A_2)$*incoming pressure

Where $A_1$=incoming (larger conduit) cross sectional area $A_2$=outgoing (smaller conduit) cross sectional area Transient pressure waves reflecting back from the pressure drive device drop in magnitude as they travel backwards up the smaller diameter conduit into the larger diameter conduit. The reflected lower pressure wave returning back to the drive device from the sudden area increase reduces the pressure against the device and can reduce work. So, in one aspect, the upstream drive pipe can be as short as practical to reduce the time between returning pressure waves. As each returning source pressure wave travels back down the larger diameter conduit and encounters the sudden reduction, it is transformed into a higher pressure wave that then impinges on and drives the drive device as the drive pipe flow is stopped and another high pressure transient pressure wave is created.

As with a sudden reduction in the upstream portion of the drive conduit, a sudden reduction in the downstream portion of the drive conduit has the disadvantage of not causing as large of a pressure rise as is possible if the high pressure waves were fully reflected from a closed valve. But, it has the advantage of automatically causing higher pressure waves toward the drive device without any moving parts or valves needing to be operated quickly, without needing energy for operation, and without needing maintenance. Particularly sudden reductions can be more advantageous in larger diameter systems where larger diameter valves have slower reaction times that require much longer drive pipes.

Figure 7:
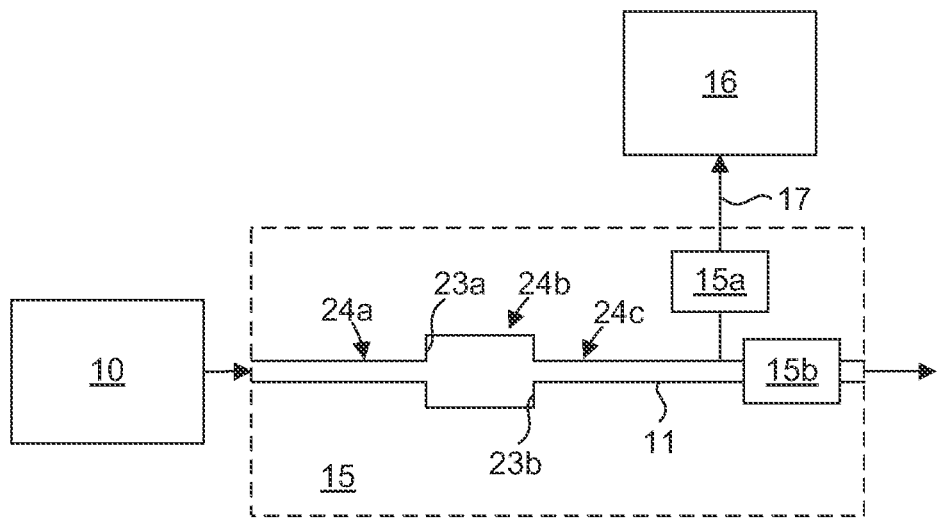
FIG. 7 is a schematic diagram of components of a transient liquid pressure power generation system, in accordance with an embodiment of the present invention.

FIG. 7 illustrates yet another embodiment of a transient pressure drive device in accordance with the present disclosure that can be operable with the system of FIG. 1. The transient pressure device of FIG. 7 is similar in many respects to the transient pressure devices of FIGS. 5 and 6, in that the transient pressure drive device can comprise a transition surface. In this case, the conduit 11 can include two transition surfaces. A transition surface 23a can be between a cross-sectional area 24a and a cross-sectional area 24b, and a transition surface 23b can be between a cross-sectional area 24b and a cross-sectional area 24c. The transition surface 23a can reflect a transient pressure wave in a direction of fluid flow from the liquid source or toward the drive component 15a, and the transition surface 23b can reflect the transient pressure wave in a direction opposite of fluid flow from the liquid source or away from the drive component 15a.

Thus, in one aspect, a pressure resonance chamber can be created from a combination of the transition surfaces placed at both ends of a larger cross-sectional portion of the drive conduit. The resonance chamber can be short or long and functions in the same manner regardless of length other than longer resonance chambers have greater friction and other energy losses than shorter resonance chambers.

High transient pressure waves created in or caused to enter a resonance chamber rapidly and alternately collide or impinge upon each end of the resonance chamber as the transient pressure waves reflect back and forth in the chamber. Each time a pressure wave collides or impinges upon the downstream chamber end, the pressure increases and liquid spurts at high pressure from the chamber as a high pressure wave into the downstream smaller diameter drive conduit. The high pressure wave travels down the smaller drive conduit to the pressure drive device where it does increased work on the pressure drive device.

Meanwhile at the same time that the pressure wave strikes the downstream chamber end, a reflection pressure wave is generated that travels back toward the other end of the chamber and impinges on the opposite upstream chamber end. That impingement on the upstream chamber end increases the pressure and reflects the wave back down the chamber while some liquid is spurted into the upstream smaller conduit. This upstream flow quickly reverses as low pressure is created at the downstream end of the chamber by the spurting of the liquid into the downstream smaller conduit and by the reverse reflection wave.

This process repeats in a water hammer type process until the elastic energy of the pressure waves is dissipated through friction and other losses. The entire resonating process is repeated when another high transient pressure wave is created in or caused to enter the resonance chamber.

The main advantage of the resonance chamber is that it repeatedly amplifies the transient pressure and sends the amplified pressure waves down the smaller drive conduit to do work on the transient pressure device. It functions automatically without any moving parts and so needs no outside control or operation, needs no additional energy to function, and needs little or no maintenance.

In one embodiment, the resonance chamber or double transition surfaces can be disposed at a dead end, such as at one end of the drive conduit or on a tee or branch line connected to the drive conduit.

Figure 8:
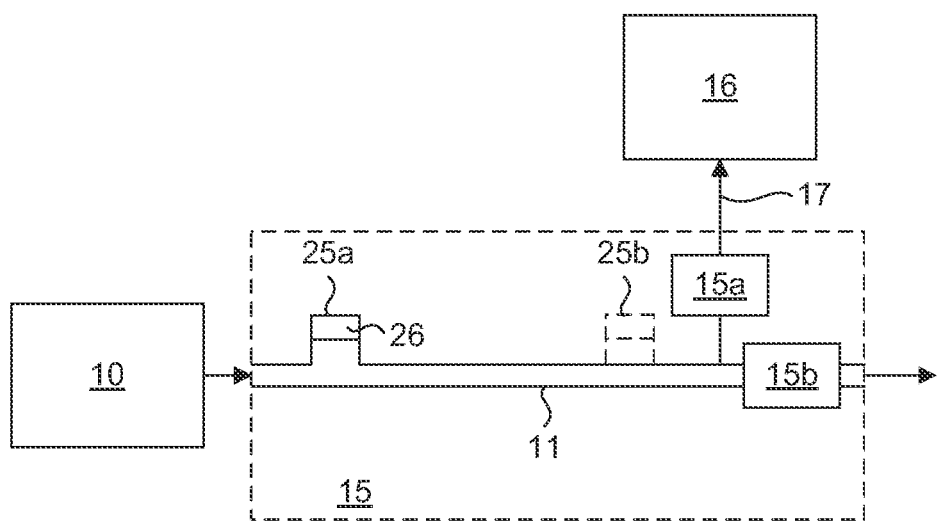
FIG. 8 is a schematic diagram of components of a transient liquid pressure power generation system, in accordance with an embodiment of the present invention.

FIG. 8 illustrates still another embodiment of a transient pressure drive device in accordance with the present disclosure that can be operable with the system of FIG. 1. As shown in FIG. 8, the transient pressure drive device can comprise a fluid chamber 25a, 25b in the liquid conduit 11. The fluid chamber can contain a compressible fluid to absorb and reflect at least a portion of a transient pressure wave in the liquid traveling through the liquid conduit. Thus, in one aspect, the fluid chamber 25a, 25b can function as a transient wave producing element. In another aspect, the fluid chamber 25a, 25b can function as a drive component. In one embodiment, the fluid chamber 25a can be disposed in the liquid conduit proximate to the liquid source. In another embodiment, the fluid chamber 25b can be disposed in the liquid conduit proximate to the drive component. In yet another embodiment, the fluid chamber 25b can be disposed before or integrated into the drive component 15a.

Air chambers have been used in ram pump devices to even the out the flow in a ram pump outflow line. The air compresses slightly during each pumping part of the ram pump cycle and then decompresses during the waste flow part of the ram pump cycle. The result is a more steady flow up the outflow line.

But, air is highly compressible and actually dissipates much of the pressure energy available in higher pressure transients. For that reason air filled chambers are also commonly used as devices that control and reduce of water hammer through dissipation of the high transient pressure energy. Nevertheless, the spring-type effect of the compressed air in a ram pump system actually stores a small amount of the higher pressure energy and improves ram pump performance.

However, for other applications, it can be desirable to replace the air in the air chamber with a compressible liquid that is much less compressible than air, but more compressible than the drive liquid (in many cases water). The more compressible liquid momentarily stores the energy of the higher pressure waves before being reflected back in the drive conduit while being able to reflect much more of the lesser pressure waves toward the pressure drive device. Greater work efficiency can thus result as more of the lesser pressure waves are caused to do work along with the higher pressure wave energy. More of the higher pressure wave energy is at first stored as it compresses the liquid in the liquid chamber and then is released to drive the pressure drive device as the pressure waves lessen and the more compressible liquid then decompresses.

Figure 9:
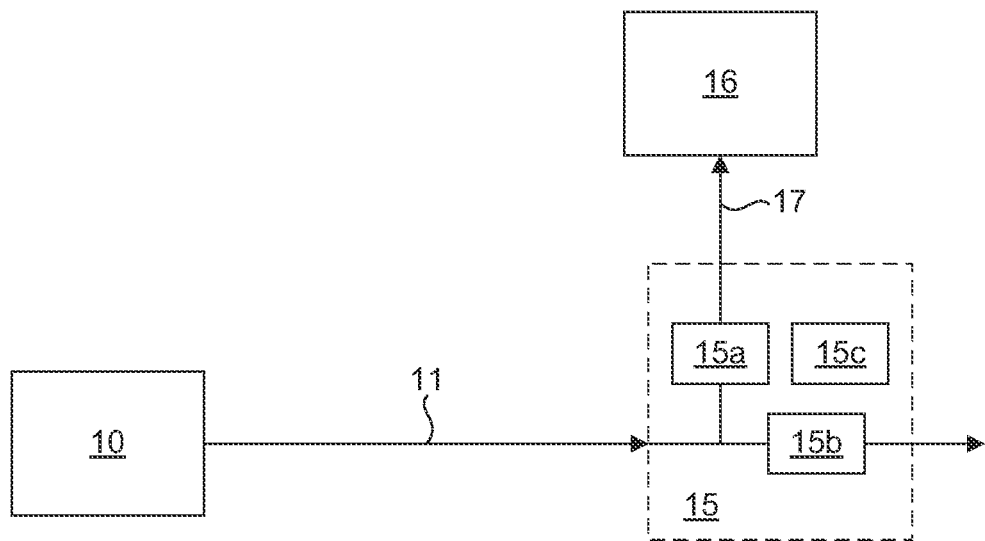
FIG. 9 is a schematic diagram of components of a transient liquid pressure power generation system, in accordance with an embodiment of the present invention.

FIG. 9 illustrates another embodiment of a transient pressure drive device in accordance with the present disclosure that can be operable with the system of FIG. 1. As shown in FIG. 9, the transient pressure drive device can be configured to progressively reduce a load on the drive component 15a. In one aspect, this can cause more work to be done by each set of high transient or water hammer type pressures created in a drive pipe by advantageously controlling the load that the pressure drive device is required to drive or push. As a set of high transient pressures is created in the drive pipe, the first transient pressures are the greatest with each succeeding transient high pressure becoming less and less as friction and other energy losses dissipate the transient pressure energy. When transient pressures are required to drive against a constant load, all of the lesser pressure transients that do not have the strength to drive the load are dissipated and lost. If however, the load against the drive device is controlled so that the load needing to be driven becomes lighter and lighter as the transient pressures drop in energy, more overall work can be done because work is extracted from the lower transient pressures as well as the higher transient pressures.

A simple example involves a modification of a typical ram pump system, represented schematically in FIG. 9 by 15c, where two valves are installed on tees at two elevations on a ram pump outflow pipeline. When the waste valve of the ram pump closes, the high transient pressures first pump water to the highest elevation at the end of the outflow line. Then just as the pumping would otherwise stop, the valve on the highest tee is opened and the lesser transient pressures are able to pump water to the elevation of that highest tee. Finally, just as the pumping would again otherwise stop, the valve for the lower tee is opened. The lesser transient pressures are able to pump water to the elevation of the lower tee. The net result is that some is water pumped to the upper outlet of the outflow line, some water is pumped to the highest tee elevation and some water is pumped to the lowest tee elevation. Whereas, without the reduction of pressure load provided by outletting the water through each successively lower tee, the only water that would have been pumped would have been that water pumped to the upper outlet of the outflow line. Check valves in the outlet pipeline just upstream of the tees can keep the pipeline filled with water. Thus, over time as the process is repeated over and over again more pumping work will be done. In one aspect, a mechanical device can continuously control the load on the pressure drive device to match the available pressure transient magnitude and energy in order to extract work from each successively lower transient pressure and do more work from each pressure transient cycle.

Figure 10:
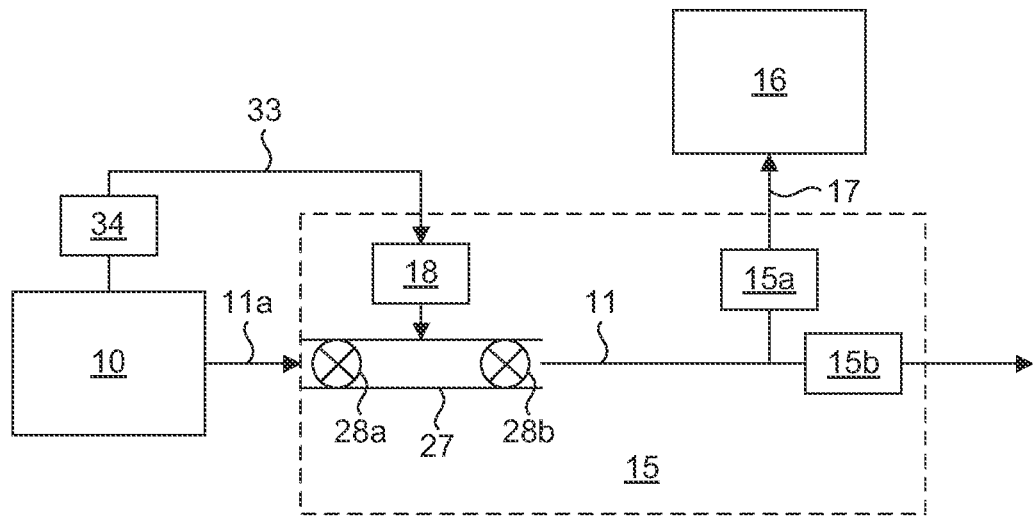
FIG. 10 is a schematic diagram of components of a transient liquid pressure power generation system, in accordance with an embodiment of the present invention.

FIG. 10 illustrates still another embodiment of a transient pressure drive device in accordance with the present disclosure that can be operable with the system of FIG. 1. As shown in FIG. 10, the transient pressure drive device can comprise a pump 18 to deliver liquid to the transient pressure drive device from the liquid source 10 via a conduit 33. In one aspect, a pump 34 can be utilized to pump the liquid through the conduit 33. In another aspect, the pump can be operably coupled to a pressure chamber 27 to deliver liquid to the transient pressure drive device. The pressure chamber can include a valve 28a at an inlet end to receive liquid from the liquid source 10 via a conduit 11a, and a valve 28b at an outlet end to discharge liquid to the drive component 15a.

This aspect of the system is analogous in some respects to an automatic hydraulic jack because it uses the same simple principle of operation; that is, the process applies repetitive liquid pressure against a piston with valves that check and stop any backward liquid flow so that the applied pressure and liquid flow is always directed forward against the jack piston and work load.

Tests have been performed on a 53-foot section of upstream ½" pressurized drive pipe, releasing water into a 26-foot section of downstream ½" drive pipe and driving a 3" piston at the far end of the downstream drive pipe. Depending upon the load placed against the piston, the work done against the piston was measured to be between 12 and 27 times the amount of energy expended to pressurize the 53-foot section of upstream drive pipe (1200 to 2700 percent efficiencies). As expected the lighter loads had higher efficiencies than did the heavier loads because more of the dropping transient pressure waves were able to do work under the lighter loads. But, the upstream check valve used tended to bounce and leak when slammed shut by the higher pressures during the tests. It is believed much better results can be obtained with a more stable and faster acting, non-leaking upstream check or control valve.

In this process, the drive conduit is not pressurized by causing the liquid to flow in the drive pipe and then stopping that flow. But rather, a part of the drive conduit is pressurized from a pressurized liquid source or from pressure applied by a piston connected to the conduit.

In one embodiment, a check or control valve can be connected to the liquid source and to a tee at the upstream end of the drive conduit and a second valve, a control valve, is installed somewhere in the downstream half of the drive conduit toward the pressure drive device. Installing the second valve at either the one-half or two-thirds points on the drive conduit works. A third valve, the pressurization valve is installed on the tee and connected to a small pressurized liquid conduit coming from the liquid source and including a pump or other pressurization device that pressurizes a small amount of liquid in the small conduit to a desired pressure to be available for use during each transient pressure drive cycle. The entire drive conduit, which is connected to the pressure drive device, is completely filled with liquid in a manner so that all air is removed. The following pressurized drive conduit work process can then begin:

1. The two valves installed in the upper part of the drive conduit are closed.
2. Liquid is drawn from the liquid source and pressurized using a pump, a piston, or any other means.

3. The pressurization valve on the tee at the upper end of the drive conduit is opened causing a small amount of pressurized liquid to flow into and pressurize the liquid in the portion of the drive conduit between the two closed drive conduit valves to the desired pressure.
4. The pressurization valve on the tee is then closed.
5. The pressurized liquid between the two valves is then quickly released into the downstream portion of the drive pipe by quickly opening the downstream control valve in the drive conduit.
6. The opening of the downstream control valve causes repeated high transient liquid hammer or water hammer type pressure waves in the entire drive conduit. High transient pressure waves travel down the drive pipe, slam into the pressure drive device, and do work.
7. Each time a high pressure wave is reflected and travels back up the drive pipe to the valve at the liquid source the valve is closed just before the wave reaches the valve so that the high pressure wave is reflected back down the drive pipe to the drive device with doubled pressure minus the friction and other losses incurred as the pressure waves travel up and down the drive conduit.
8. As the high pressure transients drive and push the pressure drive device, low pressure waves are caused that travel back up the drive conduit to the liquid source.
9. Each time a low pressure wave reaches the check or control valve at the liquid source, it opens and lets water into the drive conduit from the liquid source.
10. In this way, the transient pressure energy is directed forward in a ratcheting type repetitive water hammer action that drives the pressure drive device doing work on the work device component 16 of the process until the transient pressure energy is expended.
11. The spent liquid in the drive device is then expended out of the drive device, passed through the heat source 13 to restore the internal molecular kinetic energy of the liquid and returned to the source to complete the cycle.
12. The process of steps 1 through 11 are then repeated.
13. The work device 16 driven in steps 1 through 11 includes a means for generating electrical power for operating the valves and a control system for operating the valves in properly synchronized manner as described here. That control system can be mechanical or electronic.

Figure 11:
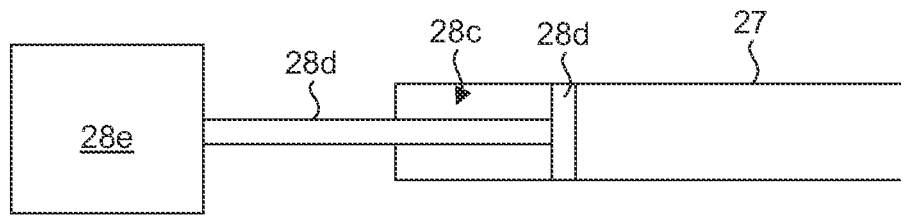
FIG. 11 is a schematic diagram of an aspect of the transient liquid pressure power generation system of FIG. 10, in accordance with an embodiment of the present invention.

In one aspect of the embodiment shown in FIG. 10, the check or control valve at the upstream end of the drive conduit 28a and the fluid link 11a from the valve 28a to the source 10 can be substituted, as shown in FIG. 11, by a combination enclosed and pressurized air cylinder 28c and piston and rod assembly 28d. In this embodiment, the piston is installed in the air cylinder such that the piston separates the pressurized air in the cylinder from the liquid in the pressure chamber 27, which can function as a drive pipe in this aspect of the embodiment. The piston rod extends from the piston through the center of the air cylinder through the sleeved and sealed cylinder end that maintains the air pressure in the cylinder. At the other end of the rod outside of the air cylinder, the piston and rod assembly 28d can be connected to any electro-mechanical device 28e that can pull the rod and piston back against the air pressure in the cylinder causing liquid to enter the cylinder from the source, and then allow the piston to move forward against the liquid while stopping any backward motion once the piston begins to move forward until the piston has reached the end of its stroke. At that point, the piston is ready to be pulled back again and the electro-mechanical device resets and pulls the piston back against the air in the cylinder causing liquid to enter the cylinder for another cycle.

In this manner, the piston and rod assembly 28d can be pulled back against the compressed air in the cylinder 28c and then allowed to be pushed forward by the compressed air in a very rapid ratcheting motion that moves the piston forward when each low pressure transient wave enters the cylinder and stops the piston when each high pressure transient enters the cylinder. In this way, high pressure transient waves can be doubled and reflected back down the drive pipe 27, while the low pressure waves and air pressure in the cylinder rapidly move the piston in tandem with the flow of the liquid in the drive pipe toward to drive device at the downstream end of the drive pipe 15a.

In general, the larger the area of the mechanical device driven by the transient pressures, the greater the work done. However, a point is reached where any greater area causes sufficient pressure wave reduction from the sudden expansion of the pressure waves into the larger area at the mechanical device to begin to reduce the work done.

The work process can require initial outside energy to start the process to operate valves and pressurize the drive conduit between the two valves, and open the downstream control valve in the drive conduit to begin the first transient pressure water hammer type cycle. Thereafter, the molecular elastic kinetic energy of the liquid harnessed and caused to do work is sufficient to continue the process in repetitive cycles so long as the molecular kinetic energy of the liquid is adequately replenished and restored as it passes through the heat source, as discussed further hereinafter.

Figure 12:
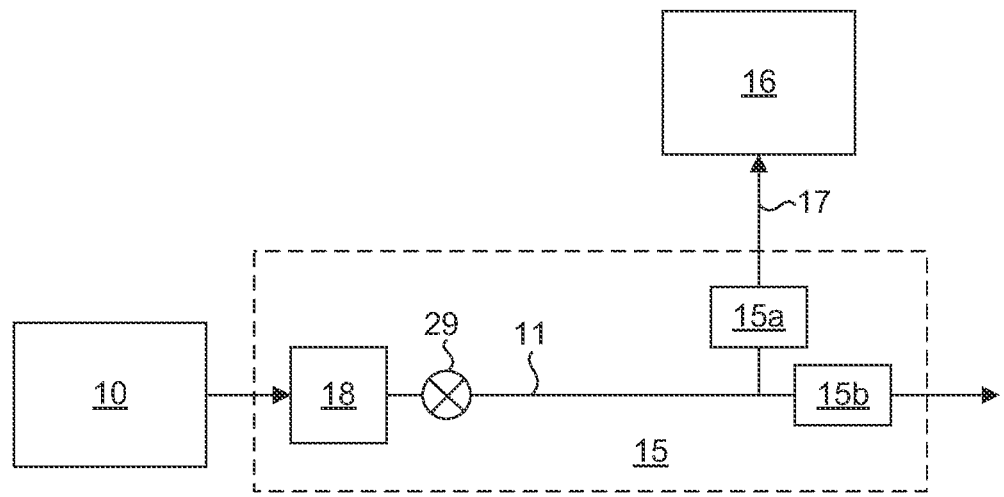
FIG. 12 is a schematic diagram of components of a transient liquid pressure power generation system, in accordance with an embodiment of the present invention.

FIG. 12 illustrates yet another embodiment of a transient pressure drive device in accordance with the present disclosure that can be operable with the system of FIG. 1. As shown in FIG. 12, the transient pressure drive device can comprise a pump 18 to deliver liquid to the transient pressure drive device through the drive conduit 11. In one aspect, the transient pressure drive device can comprise a valve 29 operable to release liquid in the drive conduit pressurized by the pump toward the drive component 15a. The valve 29 can comprise a one-way control or check valve provided at the upstream end of the drive conduit. In one aspect, a fast acting check or control valve can cause more work to be done.

In one aspect, the pump provides the initial velocity and liquid momentum in the drive conduit. In another aspect, the energy input to the pump and valve operations can be provided by the heat energy input from the heat source of the recycling process. The heat source can replenish the process energy through heat energy transfer back into the liquid. In that way continuous work can be done without the need for a booster pump periodically powered by an outside energy source.

In some embodiments, the transient pressure drive device 15, such as the drive component 15a or a transient pressure producing element, can operate in fully confined pressure conditions so that no part of the transient pressure is dissipated through a nozzle or other device that opens to atmospheric pressure without first causing the transient pressurized liquid to do work on the drive component.

Figure 13:
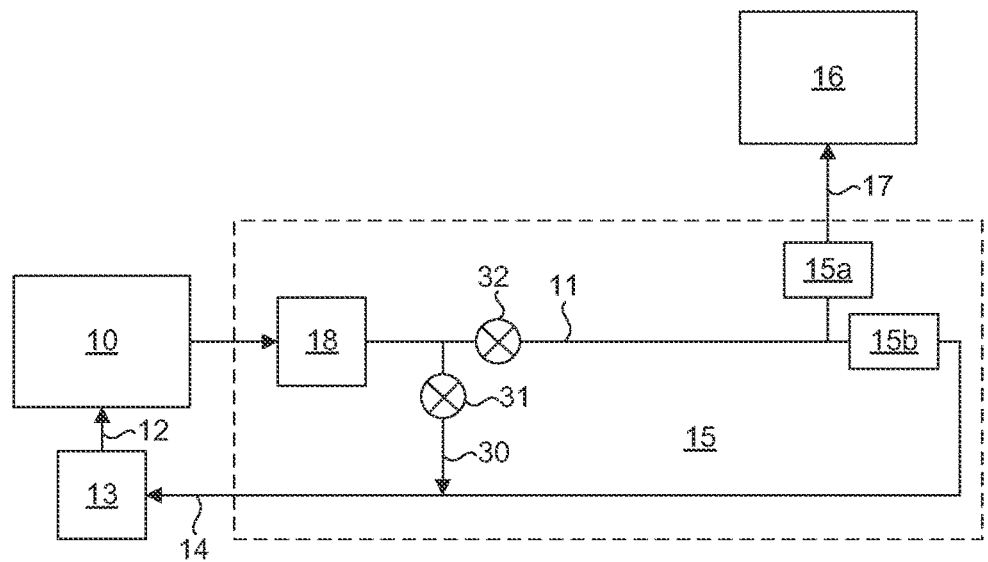
FIG. 13 is a schematic diagram of components of a transient liquid pressure power generation system, in accordance with an embodiment of the present invention.

FIG. 13 illustrates another embodiment of a transient pressure drive device in accordance with the present disclosure that can be operable with the system of FIG. 1. As shown in FIG. 13, the transient pressure drive device can comprise a bypass line 30 and a bypass valve 31 associated with the bypass line. The bypass valve can be operable alternately to open to divert liquid from the drive component 15*a* back to the liquid source 10, such as via conduits 14 and 12, and to close, thus blocking the bypass line, to initiate a high pressure transient pressure wave in the liquid in the drive conduit 11. In some embodiments, the valve 31 on the bypass line can be located at a tee in the drive conduit at any point in the upstream two-thirds of its length. The drive conduit can be filled with liquid its entire length from the source 10, or optional pump 18, to the drive component 15*a*.

In operation, at first liquid can flow from the source 10 by gravity or pumping down the drive conduit to the bypass tee and valve where the flow exits the drive conduit into the bypass line and is returned to the source by gravity or pumping. Meanwhile, the liquid in the remainder of the drive pipe downstream of the bypass tee to the drive device 15*a* can be at rest. Then the bypass valve can be quickly shut creating transient pressure waves in the drive conduit. Two one-half magnitude pressure waves are generated, one that travels down the remaining drive conduit to drive component and one that travels back up the drive conduit toward the source thereby pressurizing the entire drive line at one time or another to one-half magnitude transient pressure. When the downstream pressure wave reaches drive component, if the drive component provides a dead end or stationary load, the one-half magnitude pressure wave will double to full magnitude sending a full magnitude pressure wave back up the drive conduit and exerting full magnitude pressure against the drive component to do work. Other transients result in a water hammer-type fashion that do work against the drive component. When the transient pressures have been expended against the drive component, the bypass valve is reopened so that flow begins again from the source through the drive conduit and into the bypass line and the cycle repeats.

For a pump driven system, the greatest work efficiency can result if the bypass line is connected near the downstream end of the drive conduit at the drive component. Also, for the protection of the pump from high transient pressures, a surge tank, air chamber, pressure relief valve discharging back to the source, or other such pressure dissipating device can be included downstream of the pump to relieve pressure, store or bypass liquid, and prevent high transient pressures from reaching and damaging the pump.

For a gravity driven system, the greatest overall efficiency can result when the bypass line is connected at a location along the drive conduit where the fall or elevation drop in the drive conduit is just enough to cause the desired liquid velocity out the bypass line and no more. That way the least friction and elevation or potential energy loss results for the bypassed flow and for the pumping energy required to pump the bypassed flow back to the source. The drive conduit downstream of the bypass valve that is pressurized by the transient pressure caused by the closing bypass valve can remain at the bypass elevation or can either drop in elevation or rise in elevation depending upon the particular need and application.

If the bypass line is located two thirds of the length of the pressure drive conduit from the source to the pressure drive component, the pressure wave that travels to the pressure drive component will reflect at the device and travel back to the bypass location in the time it takes the pressure wave that travels back up the conduit to reach the source. The reflection wave from the source that then travels back down the conduit will meet the wave reflected from the pressure drive component at the one-third point on the conduit.

If the bypass line is located one third of the length of the pressure drive conduit from the source to the pressure drive component, the pressure wave that travels down the conduit to the pressure drive component can reflect at the device in the same amount of time that the pressure wave that travels back up the conduit takes to travel back to the source and be reflected back down to the bypass line. The reflection wave from the source that then continues to travel down the conduit and can meet the wave reflected from the pressure drive device at the two-thirds point on the conduit.

Locating the bypass line at other locations along the drive conduit can cause similar but different timing of pressure wave reflections. In one aspect, the location of the bypass line and the drive conduit length can be selected so as to have the least loss of energy from bypassed liquid while pressurizing as much of the drive conduit length as possible with high transient pressures during each cycle.

In one aspect, an optional valve 32, such as a fast acting control or one-way valve, can be included in the pressure drive conduit just downstream of the bypass line and bypass valve. The valve 32 can function automatically or can be controlled to open to admit liquid into the downstream drive conduit when pressure is low in the downstream conduit and to quickly close during high pressure waves so that as near as possible the high pressure wave is doubled and reflected back down the drive conduit to the pressure drive component.

With further reference to FIG. 1, in one aspect, the system 1 can provide a renewable or in some aspects reusable energy cycle process that can operate from many sources of heat energy whether that heat source is solar rays, air, water, earth, geothermal, nuclear, fossil fuel, or any other heat source. Liquid from the liquid source 10 can be released or pumped into the drive conduit 11. The confined flowing liquid can be conveyed at a velocity in the drive conduit to the downstream transient pressure drive device 15 where the liquid flow enters and passes through the transient pressure drive device component. This component can include any configuration and construction, such as those described hereinabove, which can repeatedly produce liquid transient high or low pressures in the liquid flow and cause the transient pressures to drive the device 16. The drive device can be directly or indirectly connected in any manner to the transient pressure drive device 15. The transient pressure drive device can produce the liquid transient high or low pressures by repeatedly stopping, substantially slowing, turning, or partially obstructing the liquid flow in any manner. Liquid flowing through and exiting the transient pressure drive device can be conveyed by the conduit 14 to the heat source 13, which can be an active or passive temperature and heat maintenance component. The liquid flow can then returned to the liquid source 10 or routed directly to the drive conduit 11 by the conduit 12.

The heat source 13 can function to restore and maintain from the surroundings or otherwise a consistent range of temperature and heat content of the liquid to achieve continuing and efficient work/energy production from the transient pressure drive device as the liquid cools down from doing work. In some embodiments, the heat source can comprise a heat exchanger. In other embodiments, the heat source can comprise a heater. In one aspect, one or more of the system components can be constructed and/or operated for temperature and heat restoration and maintenance from the surroundings so that a separate heat source may not be required in some applications if sufficient temperature and heat maintenance is achieved by the other components for consistent, efficient, and continuing operation. In another aspect, sufficient active or passive heat transfer and temperature restoration can be accomplished in the system components as a whole to restore and maintain consistent work producing liquid temperatures and heat content as the liquid returns and flows into the drive conduit 11 and transient pressure drive device 15 components.

In one embodiment, the liquid return conduit 12 may be omitted if liquid conservation is not needed in a particular application. In this case, liquid flow can be conveyed as needed through the outflow conduit 14 to the heat source 13, followed by being released to waste from the system rather than being returned to the liquid source.

As work is done, internal molecular energy is extracted from the liquid and transferred through the pressure drive device to a work device 16 that does useful work on things outside of the system such as generating electricity for use or operating any type of machinery. As each cycle extracts internal molecular energy from the liquid, the internal kinetic energy of the liquid molecules is correspondingly reduced. Since temperature is a measure of the internal kinetic energy of a liquid, that reduction in internal molecular kinetic energy is manifested in a reduction or cooling in the temperature of the liquid.

Each cycle extracts an incremental amount of internal kinetic energy from the liquid and causes an incremental amount of additional cooling. If operated in perfect thermal isolation, the repetitive work cycles would cause the liquid to cool down until it began to solidify as slush and the process would stop. However, in actual operation, heat energy from the surroundings (usually the air, but can be the earth, water or anything else with heat energy) can be passively or actively used to transfer heat energy back into the liquid and warm it back up after it has been caused to do work.

The function of the heat source is to warm the liquid back up to its original temperature through heat exchange or any other means. The heat source can thus restore the internal molecular energy content of the liquid and acts as the component that provides the outside energy required for continuing operation.

An example of a heat source is a tube and fin-type metal heat exchanger whereas the liquid passes into the heat exchange the flow divides and passes through a number of metal tubes that have a large number of fins with a large surface area. As the liquid passes through the tubes, air is caused to pass across the tubes and fins. The fins and tubes are heated by the air passing around them. In turn, the heated tubes and fins cause heating of the liquid passing through the heat exchanger tubes. By the time, the liquid passes out of the heat exchanger, it has been heated or warmed back up to its original operating temperature. The internal molecular kinetic energy of the liquid has thus been restored and the liquid is thus ready to be used again in another transient pressure work process cycle.

The design and proper sizing of such a tube and fin-type heat exchanger is a well-known science and such heat exchangers are commonly designed and used in air conditioning systems, automobiles as radiators, and numerous other applications. But, as an example, a heat exchanger that could function as the heat source for a transient pressure work process energy system generating 18 KW of power, can comprise a 6-foot wide by 5-foot tall, and 4-inch deep fin and tube type heat exchanger. The fins and tubes are arranged in similar fashion to that of an automobile radiator having a total fin and tube area of 2,167 square feet. A fan is used to continuously blow fresh or new air through the exchanger to accomplish the transfer of heat from the air into the liquid flowing in the tubes of the heat exchanger.

Thus, the heat source, which can comprise of a heat exchanger, a reservoir, or a length of conduit, or any other such suitable design, functions to restore the internal molecular kinetic energy of the liquid molecules to their original energy level and temperature after being caused to cool down in the work process. That restoration of the internal kinetic energy of the liquid molecules ensures that continuing work can be done by the repetitive transient pressure cycle and process. In that manner, sufficient molecular kinetic energy can be harnessed to cause the system to be self-operating extracting heat from the air or other surroundings and transferring that heat into the process liquid and then causing elastic reactions in the restored internal molecular kinetic of the liquid molecules that cause repeating high transient pressures that can be caused to do work.

In one aspect, two keys to a successful continuing process are: 1) to avoid relieving the elastic pressure energy available in the repeating high transient pressures without first making those transient pressures do work as they are released and relieved, and 2) to reduce the friction and pipe flexure losses during the repetitive water hammer type cycle. For example, the stronger and more rigid the materials of the pressure drive conduit and pressure drive device, the greater the available pressure energy, because the rigidity of the materials prevents relieving the transient pressure through flexure of the conduit and device walls. Also, expansion of the liquid into an air chamber, a low pressure liquid source, a larger diameter conduit, or to atmospheric pressure relieves part or all of the transient pressure without doing work.

As for the proper length of the drive conduit, traditional ram pump design has held one or more of several empirical relationships relating the drive pipe length either to the drive bead or fall in the drive pipe or the length divided by the diameter of the drive pipe. However, research and analysis by Young, in his paper "Simplified Analysis and Design of the Hydraulic Ram Pump" (Proceedings of the Institution of Mechanical Engineers, Part A: Journal of Power and Energy, 1996, 210:295) determined that these empirical relations actually have little to do with how to determine the proper length of a drive pipe. He pointed out that Azoury, Baasri, and Najm in their paper "On the Optimum Utilisation of Water Hammer" (Proceedings of the Institution of Mechanical Engineers, Part A Journal of Power and Energy, 1988, 202(A4):249-256) had indicated the minimum drive pipe length is determined by how fast the waste valve closes. They indicated the drive pipe length needs to be at least sufficient so that the closing valve completely closes before the first returning transient pressure wave has time to return down the drive pipe back to the valve. Young then derives and proposes an equation for determining maximum drive pipe length for a steel pipe as:

$$L\text{max} = 110HD$$

where $L\text{max}$:=maximum drive pipe length (in meters)
$H$=head on the drive pipe at the waste valve (in meters)
$D$=drive pipe diameter (in meters)

That equation can be used to determine a maximum drive pipe length. However, finding the optimum drive pipe length involves the balancing of the friction and other energy losses in the drive pipe against the energy used in operating the valves and against the frequency of valve causing wear and tear on the valve. The speed of the valve closure determines the minimum length of the drive pipe. Any longer drive pipe results in more friction and other energy losses. So, the drive pipe should be as short as possible based on the speed of the valve. But, on the other hand, a shorter drive pipe requires many more valve movements per second or minute than a longer drive pipe. Thus, the drive pipe length is determined by balancing drive pipe friction and other energy losses against the energy consumption of valve operation, the required speed and frequency of their operation, and the resulting wear and tear of operation.

As discussed above, work and heat are processes by which energy can be transferred in and out of a system of mass, and energy, like mass, can be neither created or destroyed but is transferred either by work or heat processes. As also discussed above, the source of the energy in a transient pressure work process is the internal molecular energy of the liquid. So, a transient pressure work process converts molecular internal energy of a liquid into pressure energy, which pressure energy does work upon the device or object being driven by the transient pressure work process. In that work process, a net transfer of internal energy out of the liquid occurs. Accordingly, the temperature of the liquid must decrease.

If the process is repeated in another transient pressure cycle, the temperature of the liquid again decreases. Assuming no heat is transferred into the liquid, the result can be a cooling of the liquid until it begins to freeze and stop functioning as a liquid. However, that situation can be avoided with the present system. Here, energy is added to the liquid through the heat transfer process in the heat source.

Thus, in some embodiments, the system can operate from any consistent source of heat energy for the heat source that can restore and maintain operating temperatures for the liquid and the transient pressure drive device. One source of heat is solar energy stored as heat energy in the air, the earth, or in natural bodies of water. Unlike many solar energy processes, the present system need not operate directly from the short-wave solar radiation of the sun. Instead, the heat source of the present system can indirectly operate from the energy of the sun by using solar energy captured and stored in things warmed directly or indirectly by the sun, such as air, water, or the soils of the earth.

The present system can thus harness energy from the sun for continuously doing any type of useful work including generating electricity, driving mechanical devices, or doing any other type of useful work. The system can therefore be versatile because it can operate and do work most anywhere on earth at most any natural air, water, or earth temperature from 60 degrees below zero Fahrenheit and below to 125 degrees above so long as a liquid is used that does not freeze or vaporize in the needed operating temperature. All substances above absolute zero (−273° C.), which is basically everything on earth, have stored solar heat energy and thus are capable of use as a source of heat in the present system as they are reheated directly or indirectly by the sun.

Thus, in some embodiments, the present system can operate at or below the ambient temperature of the air, water, soil, or other substance used as the heat source. The energy cycle accesses the internal energy of a liquid to do work without having to heat the liquid up first. Rather, the energy cycle begins at whatever temperature state the liquid is in and then causes the liquid to cool down as work is done. The temperature of the cooled liquid can be restored to any desired temperature through heat exchange with any suitable heat energy source. As a result, any amount of cooling in one or more work cycles or events can be allowed to occur prior to restoring the liquid temperature so long as the liquid does not begin to freeze or transition to a solid state. The present system can therefore be versatile and can operate in any temperature range for any mass in its liquid state.

In one aspect, the present system can be operated so that there is no waste stream of any kind whether liquid, gas, particulate, or other solid. Rather, there is only transformation of liquid internal molecular energy into liquid pressure energy, transfer of energy out of the liquid by doing work, and transfer of energy back into the liquid by heat.

In another aspect, an initial amount of outside energy may be supplied to the system in order to begin operation of the system. Once operating properly, however, the energy cycle can sustain itself in whole or in part and produce an amount of useful work within the physical limits of the energy that can be stored in the liquid, the energy that can be transferred out of the liquid by doing work, and the energy that can be transferred back into the liquid by the heating process.

The Energy Source and Application of Thermodynamic Principles

As discussed hereinabove, the analysis of ram pump system efficiencies has shown that transient pressure waves are caused by elastic reactions caused by internal molecular kinetic energy of liquids. These internal elastic reactions create transient pressures that can be used to do work in repetitive water hammer type cycles. But, energy, like mass, can be neither created nor destroyed. Energy can be stored in a mass, or can be transferred in or out of the mass either by work or heat processes. But, it cannot be created. Work done by transient pressure processes transfer energy out of the liquid mass. Mathematically, the First Law of Thermodynamics states:

$$E_1 - E_2 = Q - W$$

where
$E_1$=initial internal energy
$E_2$=final internal energy
Q=heat transfer
W=work done on system (becomes positive when work is done by the system)

The law thus requires that the energy of a system must decrease when work is extracted from it unless an equal amount of heat is added at the same time. It can be shown that in a transient pressure work process, as work is extracted from the internal elastic energy of the liquid, the internal energy decrease is manifested as a temperature decrease.

The internal energy of a liquid encompasses all molecular energy of the liquid. But, for transient pressure processes, the attraction energy and the translational kinetic energy of the moving liquid molecules are the important portions of the total molecular internal energy. It is the translational kinetic energy that reacts to create high transient pressures while it is the attraction forces that constrain liquid expansion to a particular volume. Because the remaining internal energy does not appear to act in transient pressure processes, the remaining internal energy can be dropped from further consideration. So, $E_1$ and $E_2$ as considered here refer only to that part of internal molecular energy, chiefly the translational kinetic energy, that reacts in the transient pressure process.

Further, it is useful to limit the energy system to be analyzed to the confined liquid itself. Energy inputs and outputs from the liquid will be analyzed. First, transient pressure processes are pressure impulse processes that happen so rapidly in the drive conduit and the pressure drive device that there is essentially no time for energy to transfer into the liquid as heat. Thus, the heat transfer term, Q, in the energy equation for the transient pressure processes in the drive pipe and pressure drive device is essentially zero and can also be dropped from the energy equation.

While, the work done in the transient pressure process is important. In a simple water hammer process, the work done by the liquid is limited to the non-useful work done on the pipe and any fittings or valves in the rapid back and forth pressure wave and liquid flow movements of the transient pressure waves. But, that water hammer process can be used to repeatedly pump water or repeatedly do work on a mechanical device. Such a work process results in work done by the liquid. So, the work term of the energy equation is positive.

Thus, dropping the heat term from the equation as insignificant, making work positive, and rearranging, the energy equation becomes simply:

$$W=E_1-E_2$$

In other words, the First Law of Thermodynamics, as applied to a transient pressure work process, requires that the work done by the liquid must result in a decrease in the internal energy of the liquid. That this decrease in internal energy necessarily manifests itself as a decrease in temperature is discussed next.

As noted above, the two internal molecular energy forces that react in a transient pressure process are the kinetic translational energy of the liquid molecules and the attractive forces exerted by the molecules upon each other.

First, the translational kinetic energy within a confined liquid, KE, can be expressed in terms of the average kinetic energy of all of the molecules of the liquid as follows:

$$KE=\tfrac{1}{2}m\,v^2$$

where
m=combined mass of all liquid molecules in the liquid volume
v=average random translational velocity of all liquid molecules in the volume It is well understood that the pressure of a liquid is directly related to the kinetic energy, $KE=\tfrac{1}{2}mv^2$. When something acts to confine the random movement of liquid molecules into a smaller space than what their kinetic energy would otherwise allow them to move, the kinetic energy of the randomly moving molecules causes them to bounce into each other with greater force. That collective momentum force of the millions of molecules striking each other and the walls of a container is called pressure. In English units, pressure has units of pounds of force per unit area such as pounds per square inch (lbs/in$^2$ or psi) or pounds per square foot (lbs/ft$^2$ or psf). The closer liquid molecules are forced together, the harder they bounce off the walls of a container and each other and the greater the pressure force. And the opposite is true, as the liquid molecules are given more volume and space to move in, the lesser the pressure force.

In a confined liquid, pressure is thus a type of direct measurement of the average internal kinetic energy of the liquid, $E=\tfrac{1}{2}mv^2$ and results from the collective momentum force of the random kinetic movement of the individual liquid molecules. It is this internal molecular translational kinetic energy that reacts and causes transient pressures when the molecules are forced closer together by their momentum or by other means. It is thus, this translational kinetic energy that by the First Law of Thermodynamics must decrease when work is done in a transient pressure process. It cannot be the attractive forces between the molecules, because those forces act toward keeping the molecules close together. Because it is the translational kinetic energy that provides the pressure to do work, it must be the internal translational kinetic energy that must decrease. The energy equation for the work process is thus written:

$$W=E_1-E_2=KE_1-KE_2=\tfrac{1}{2}mv_1^2-\tfrac{1}{2}mv_2^2 \text{ or}$$
$$W=\tfrac{1}{2}m(v_1^2-v_2^2)$$

Thus, the energy source for the work done by the liquid in a transient pressure process on its surroundings is the internal random translational kinetic energy of the liquid molecules. As the work is done, part of that energy is transferred from the liquid molecules to the device driven. That energy transfer causes a decrease in the average internal translational kinetic energy of the molecules and a reduction in the average random translational velocity of the liquid molecules by the amount $v_1-v_2$. That this decrease in internal translational kinetic energy in the liquid necessarily results in a decrease in the temperature of the liquid is next shown.

Temperature is a direct measure of the kinetic energy, $KE=\tfrac{1}{2}mv^2$ of a liquid or gas. For example, a common measuring device for temperature is a liquid thermometer. A liquid thermometer measures the change in volume of the liquid within the thermometer when exposed to a hot or cold substance. When exposed to a hot substance, heat transfers from the substance into the liquid within the thermometer. That heat energy transfer increases the kinetic energy of the thermometer liquid molecules. The randomly moving liquid molecules then have more kinetic energy to overcome the attractive forces that hold them together. That increased energy allows the randomly moving liquid molecules in the thermometer to bounce and become farther apart. That greater movement of the molecules causes the liquid volume to increase. And, that volume increase is seen in the thermometer tube as a rise in the liquid column giving a higher temperature reading.

The opposite is true when the thermometer is exposed to a cold substance. The heat energy transfer from the thermometer into the cold substance causes the liquid molecules in the thermometer tube to lose kinetic energy. That loss allows the attractive forces between the molecules to pull the molecules closer together. The thermometer liquid contracts and causes a shortening of the liquid column. A colder temperature reading is the result.

Thus, what is important here is to understand that temperature and pressure are measures of, and result from, the same thing—internal kinetic energy of the liquid molecules. When that internal molecular kinetic energy changes the two measures of that internal kinetic energy, temperature and pressure, change accordingly. An increase in internal molecular kinetic energy increases temperature and pressure. Likewise a decrease in internal molecular kinetic energy decreases temperature and pressure.

Finally, if the liquid is caused to do work by harnessing its internal molecular kinetic pressure energy force in a liquid transient work process, as shown above the First Law of Thermodynamics holds that work energy transfer of necessity decreases the molecular kinetic energy of the liquid molecules. That loss of molecular kinetic energy causes the molecules to come closer together, and so, the temperature, which is a measure of that collective distance between molecules, decreases accordingly.

The result of the work process is thus equivalent to that which occurs with a loss of molecular kinetic energy through the cooling heat transfer process. That fact means that the liquid literally cools in temperature as work energy is extracted from the molecular kinetic, or momentum forces, of the liquid molecules. This fact is extremely important because it is that cooling of the liquid as work is extracted from the liquid in a transient pressure work process that makes it possible to add energy back into the liquid through simple heat exchange.

The change in temperature of the liquid to its final state of kinetic energy can be determined from the specific heat (or heat capacity per unit mass) property of the liquid, usually denoted with the symbol c, but here denoted as s. The well-known equation relating the specific heat of a liquid to its change in temperature is:

$$\Delta T = \frac{Q}{m*s}$$

where $\Delta T$ = change in temperature
$Q$ = the heat or kinetic energy loss from the work done
$m$ = mass of the liquid
$s$ = specific heat of the liquid
for water = 1.0 cal/g °C. at 25° C. or 1 Btu/lbm °F.
    = 778.169262 ft-lbs/lbm °F.

Here, energy is extracted from the liquid by doing work. As just noted above, the results of a transient pressure work process is the equivalent of extracting heat energy (as measured by temperature) from the liquid. So, the equation can be written:

$$-\Delta T = \frac{W}{m*s}$$

where $\Delta T$ = change in temperature
$W$ = the work done by the liquid in the transient work process
$m$ = mass of the liquid
$s$ = specific heat of the liquid
for water = 1.0 cal/g °C. at 25° C. or 1 Btu/lbm °F.
    = 778.169 ft-lbs/lbm °F.
    = 389.084631 ft-lbs/cup °F.

The negative sign used in the equation denotes a decrease in temperature. The following table provides perspective for the potential work energy available in the internal molecular energy of a volume of water molecules. The table assumes a repetitive transient work process cycle that occurs at the rate of one work process cycle per second, which for circular motion is 60 rpm. The power available for various temperature changes or decreases is thereby computed as follows:

| | Temperature Change | | |
|---|---|---|---|
| Volume of Water | 1° F. | 5° F. | 10° F. |
| 1 cup | 0.71 hp | 3.53 hp | 7.10 hp |
| 1 quart | 1.42 hp | 7.10 hp | 14.2 hp |
| 1 gallon | 5.68 hp | 28.4 hp | 56.8 hp |
| 1 cubic foot (ft³) | 42.5 hp | 212 hp | 425 hp |

In a ram pump process, the temperature reduction in the liquid is slight and does not matter because the water is sent on to use as a water supply. But, for a system that returns the liquid to the source to do more work, the work energy extracted from the liquid must be replenished. Without that replenishment, if the work process is repeated in another transient pressure cycle, the temperature of the liquid again decreases. Taken to the extreme, and assuming no heat is transferred into the liquid, the result would be a repeated cooling of the liquid until it began to freeze and turn to slush. In that state, transient pressures could no longer be produced and the work process would stop.

However, since the extraction of the work energy from the liquid manifests itself as a cooling in temperature or temperature reduction, another law of thermodynamics can be used to replenish the energy in liquid that is to be returned to the source, recycled and reused in a liquid transient pressure work process. That law holds that when two bodies of mass of different temperatures are placed in contact with each other, heat transfer will occur from the mass with the higher temperature to the mass with the lower temperature until the temperatures of both masses become equal.

So, what can be done to replenish the energy extracted from the liquid in a transient pressure work process is to expose the liquid to a warmer mass that can warm the liquid back up after its use in the process. That warmer mass can be air, earth, water, or anything else with sufficient heat energy to warm the liquid back to its original temperature. The heat transfer can be accomplished with any heat exchanger of sufficient size and surface area and liquid transit or exposure time to accomplish the required heat transfer of energy from the air, earth, water, or other mass into liquid.

The design of heat exchangers is a well-known science. Heat exchangers are commonly used in air conditioning systems, refrigerators, in automobiles as radiators and the like to transfer heat from a liquid into the air. They can also be used to transfer heat from the air into the liquid. Such fin and tube-type heat exchangers are common, but many other types and means for temperature and heat exchange exist. Any device or process that can accomplish the required heat exchange can be used.

Here, a fin and tube-type heat exchanger will be used as an example. As presented above, water has a sufficiently high specific heat capacity to do a significant amount of work from a reasonable temperature change or reduction. For example, a transient pressure work process having a flow rate of 3.0 feet per second in a 3-inch pipe or 0.147 ft³/s, has sufficient internal energy to produce 18 KW of power or electrical energy with a temperature drop or reduction of 1.0 degree Celsius or 1.9 degrees Fahrenheit.

Thus, in a transient pressure work process with water flowing at a net flow rate of 0.147 ft³/s from the liquid source at a temperature of 70 degrees Fahrenheit (21.1 degrees Celsius) through the drive conduit and pressure drive device, where transient pressures are produced and used to extract 18 KW of power and work energy from the internal energy of the liquid, will discharge from the pressure drive device at 68.1 degrees Fahrenheit (20.1 degrees Celsius).

Before being returned to the liquid source, the 0.147 ft³/s of cooled down liquid flow, is passed through a fin and tube-type heat exchanger with sufficient capacity to use air at 70 degrees Fahrenheit (21.1 degrees C.) to warm the 68.1 degree Fahrenheit (20.1 degrees C.) liquid back up to the original liquid source/operating temperature of 70 degrees Fahrenheit. The mass flow rate of the water is 4.15 kg/s. The specific heat of the water is 4181 J/kgK, the specific heat of the air is 1006.8 J/kgK, the air density at sea level is 1.1614 kg/m³, and the required heat transfer rate is 18,000 W. Using these values and the principles of conservation of energy, an air mass flow rate of 5 kg/s will heat the water passing through the air exchanger back up to 70 degrees Fahrenheit while the air passing through and against the fins and tubes of the heat exchanger will cool down by 4.6 degrees Fahrenheit (3.6 degrees C.). The volumetric flow rate of the air would need to be 4.31 m³/s.

Using a conservative overall heat transfer coefficient of 25 W/m²K, the required area of the heat exchanger fins is 2167.4 ft². That heat exchanger area can be compactly provided in the relatively closely packed radiator style fin and tube-type design commonly used in automobile radiators such that the heat exchanger could be about 6.0 feet wide and 5.0 feet high with a 4-inch depth. At that size, the velocity of the air coming into the heat exchanger would need to be 4.3 ft/s, or about 3 miles per hour, which is a reasonable air velocity for practical operation.

After passing through the heat exchanger, the now 70 degree Fahrenheit temperature liquid would be returned to the liquid source with its internal energy replenished and ready to be used again in the transient pressure work process.

Energy Analysis for Complete Operation of a Transient Pressure Work Process and System The above shows where the energy comes from to operate a continuous transient pressure work process. It comes from the internal kinetic molecular energy of the liquid. What remains is to show that sufficient energy can be extracted from the elastic reactions of the liquid in the transient pressure work process to not only sustain its continuous operation, but produce energy for uses outside of the system as well. That fact can be shown from an energy balance. It will be done for the 18 KW transient pressure work process used as an example for the heat exchanger analysis above. But, first the total available transient pressure energy needs to be established.

Total Available Elastic Energy

The total molecular elastic energy created in the drive pipe when the liquid is first stopped by a fast acting valve can be determined from Newton's Second Law: F t=m v, where F=force exerted by the stopped liquid, t=time required for the liquid column to come to rest, m=mass of the liquid column stopped in the drive conduit, and v=the original velocity of the liquid column immediately before being stopped. The force is equal to the pressure multiplied by the valve area and the mass is equal the unit mass of the liquid multiplied by the volume so that:

$$F\ t = m\ v \tag{15}$$

$$P\ A\ t = \rho\ A\ L\ v, \tag{16}$$

where P=pressure/unit area, A=area of the valve, ρ=unit mass, L=Length of the liquid column and A L=the volume of the liquid column. The pressure wave caused by the stopping liquid travels up the drive conduit at the speed of a pressure or sound wave, known as the wave celerity, $c_p$. At any time t the length of the column that has come to rest can thus be determined by L=$c_p$ t. Rearranging t=L/$c_p$ and substituting this relation into (16), the equation becomes:

$$\frac{PAL}{c_p} = \rho A L v, \tag{17}$$

then rearranging gives:

$$P\ A\ L = \rho\ A\ L\ v\ c_p \tag{18}$$

Equation (18) is in units of energy (foot-lbs, N·m, or Joules) with the left hand side representing the pressure-volume energy relation familiar when working with gases since A L equals the volume of the liquid column. But, here the right hand side of the equation represents the momentum energy, m v $c_p$. In concise form, the equation can be written as:

$$P\ V = m\ v\ c_p \tag{19}$$

Equation (19) has a striking resemblance to the energy equation for ideal gases, P V=nRT. That equation expresses the total amount of pressure energy stored in a gas at any pressure and volume. Whereas, equations (18) and (19) express the total amount of pressure energy stored in a confined liquid at rest at any pressure and volume (P V), or the total amount of momentum energy of a moving confined liquid (m v $c_p$). Bringing that liquid column quickly to rest will cause pressure energy of the magnitude: P V. While quickly releasing that confined liquid, will create momentum energy in the liquid column of magnitude: m v $c_p$.

Equations (18) and (19) have units of energy (foot-lbs, N·m, or Joules). The left hand side of equation (19) (P V) represents the pressure-volume energy while the right hand side of the equation represents the momentum energy (m v $c_p$). The equation shows that the total amount of pressure energy stored in a confined liquid at rest at any pressure and volume (P V) can be converted to momentum energy in a moving confined liquid column (m v $c_p$) and vice versa. Bringing the liquid column quickly to rest converts the momentum energy of the liquid column into pressure energy of the magnitude: P V. While quickly releasing that confined liquid, converts the P V energy into momentum energy in the liquid column of magnitude: m v $c_p$.

The equation can be used to determine the total energy available in a liquid transient process. The equation shows that a very large amount of potential energy is stored in any confined column of liquid under pressure. For example, a 20-foot long section of 3-inch (0.25 foot) diameter conduit filled with liquid at just 100 psi pressure has potential energy at rest of P V=P A L=100×144×π×(0.25)²/4×20=14,137 ft-lbs of energy. If pressurized and released at the rate of one cycle per one second or 60 cycles per minute (a common ram pump cycle time, which requires time for hydraulic recoil and opening of the waste valve, not needed here with an electrically operated valve) that energy has a 25.7 horsepower or 19.67 KW power potential.

In a water hammer process, that 14,137 ft-lbs of energy is what causes the water hammer. The repetitive hammer of the progressively smaller pressure waves move rapidly back and forth at the speed of sound (the celerity, $c_p$) through the length of the 20-foot pipe until the 14,137 ft-lbs of energy has been dissipated by friction and other losses. But, that repetitive hammer can be harnessed so that much of the 14,137 ft-lbs of energy is made to do work. It is generally the repetitive nature of the water or liquid hammer that makes it possible to extract more work from the transient pressure energy than it takes to create or cause it.

Application to an Example Transient Pressure Work System

Figure 14:
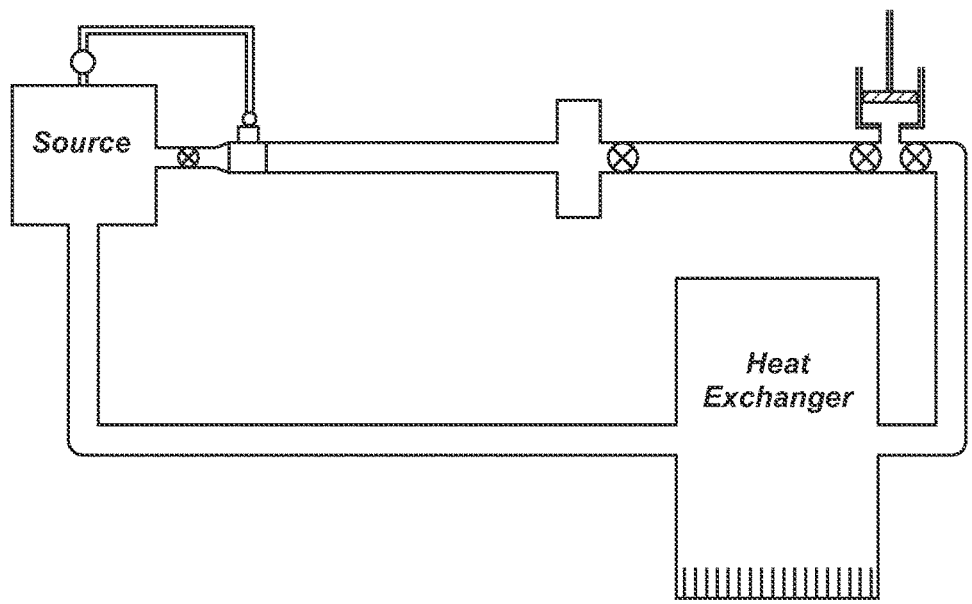
FIG. 14 is a schematic diagram of a transient liquid pressure power generation system, in accordance with an embodiment of the present invention.

An example transient pressure work process is illustrated in FIG. 14, and comprises elements of the system described hereinabove with the addition of sudden reductions and a resonance chamber. A 40-foot long upstream section of 3-inch diameter galvanized steel drive pipe is connected on its downstream end to a 2-foot long 12-inch diameter galvanized steel pipe that functions as a resonance chamber. A 20-foot long downstream section of 3-inch diameter galvanized steel drive pipe is connected to other end of the resonance chamber/pipe through a 3-inch diameter electrically operated control valve.

At the upstream end of the upstream drive pipe, is connected a 3-inch diameter galvanized steel pressurization tee with an electrically operated ½-inch pressurization valve connected into the system on the 90-degree bend side of the tee. On the straight through side of the tee is connected a 1-inch diameter electrically operated control valve that acts as a sudden drive pipe reduction as well as a control valve. The 1-inch control valve in turn connects the pressurization tee and drive pipe assembly to a low pressure liquid source reservoir containing liquid at a temperature of 70 degrees Fahrenheit.

At the downstream end of the drive pipes is connected a 3-inch automatic hydraulic pressure controlled check valve that connects the drive pipes to a transient pressure drive device. The transient pressure drive device includes a 3-inch tee connected to the drive pipes on the upstream side through the automatic check valve. A 3-inch electrically controlled waste valve is connected to the downstream side of the tee while the 90-degree bend side of the tee is connected through a sudden enlargement to a 6-inch cylinder and piston assembly. In turn the piston is connected through a piston rod to any generating device that can generate 18 KW of electrical power from the reciprocating action of the piston. The waste control valve in turn is connected on its downstream side to the heat exchanger described in detail above and designed for 18 KW of heat transfer from moving air. The heat exchanger is in turn connected to the liquid source to complete the transient pressure work process loop.

Finally, a pressurization pump is connected to the reservoir through a separate ½-inch pipe and to the ½ inch pressurization valve on the upstream end of the drive pipes.

An energy analysis of a system in accordance with the present disclosure is set for the hereinafter. All valves begin in the closed position and all pipes, the pressure drive device, and the heat exchanger are filled with water with all air removed. As the work process begins, the pressurization pump operates to provide 400 psi pressurized liquid into the ½ inch pressurized water supply line while the ½-inch pressurization valve opens to admit the pressurized liquid into the upstream 40-foot section of drive pipe. When the upstream section of drive pipe is pressurized to 400 psi, the ½-inch pressurization valve closes.

The energy required for this pressurization process includes the energy required to operate the pump and provide 400 psi liquid through the short ½-inch pressurization pipe and valve into the upstream drive pipe section and the energy required to operate the ½-inch electrically operated pressurization control valve. The distance the water moves in the drive pipe during the compression or pressurization by the pump can be computed from the bulk modulus of elasticity of water (about 300,000 psi) with the result increased slightly to account for the elasticity of the steel pipe. A sufficiently accurate approximation for this increase is to multiply the length computed from the bulk modulus of water by the ratio of the wave celerity of water (4,720 ft/s) divided by the wave celerity in the pipe (4,590 ft/s). The distance the water moves in the 3-inch pipe to pressurize the 12-inch resonance chamber is:

$$\text{Length} = Ac/Ap \times P/B \times L \times 4720/4590$$
$$= 0.785/.049 \times 400/300,000 \times 2 \times 4720/4590$$
$$= 0.044 \text{ ft}$$

The distance computation for the 40-ft length of pipe upstream pipe is:

$$\text{Length} = P/B \times L \times 4720/4590 = 400/300,000 \times 40 \times 4720/4590 = 0.055 \text{ ft}$$

So, the total force distance, d, in the 3-inch pipe is: 0.044+0.055=0.099 ft.

The work done or energy used to pressurize the upstream drive pipe can be computed from the well-known equation: W=F×d where F=force and d=distance. The force is the pressure, P=400 psi times, area for a 3-inch diameter pipe is A=7.069 in². A 50 percent efficiency for the pump providing the pressure force is assumed. The work done on the liquid to pressurize the liquid to 400 psi is computed:

$$W = F/e \times d = 400/0.5 \times 7.069 \times 0.099 = 559.8 \text{ ft-lbs}$$

The friction and minor losses in the ½-inch pipe are minimal because the pipe is short, but a conservative maximum of 1 psi (2.31 ft) pressure loss will be used here. Thus, the pump must provide 401 psi water at the pump. The maximum 1 psi pressure energy loss incurred in moving the water column in the 3-inch pipe by 0.099 ft is:

$$W = A\,L\,\gamma\,h/e = 0.099 \times 0.049 \times 62.4 \times 2.31/0.5 = 1.4 \text{ ft-lbs}$$

The energy required to operate the ½-inch valve which can be accomplished with 10 watts or less of energy or 7.4 ft-lbs. The total energy used to pressurize the 40-foot section of upstream drive pipe and the resonance chamber is therefore less than 570 ft-lbs.

In contrast, the energy then made available in the 40-foot pressurized section of 3-inch pipe and 2-foot long resonance chamber for doing work is computed as:

$$\text{Energy} = P\,V = 400 \times 144 \times (\pi \times (0.25)^2/4 \times 40 + 2.0 \times \pi \times (1.0)^2/4) = 203{,}575 \text{ ft-lbs}$$

The difference in energy expended to pressurize the system versus the potential made available energy is more than 203,005 ft-lbs. Of course not all this available energy can be harnessed, the moment any of this pressure is relieved that part of the energy not made to do work will immediately revert back to unusable internal energy. But, the computation shows that there is over fifteen times more potential energy available to produce the needed 18 KW or 13,275 ft-lbs/s when the work process cycle is repeated once every second.

So, to extract 13,275 ft-lbs of energy every second from this 203,575 ft-lbs of available energy each second, an operation cycle is repeated once every second. The control valve that separates the upstream drive pipe and resonance chamber from the downstream drive pipe section is quickly opened. That valve action quickly releases the pressure into the 20-foot downstream drive pipe section and causes transient pressure waves that travel repeatedly at the speed of sound through both pipes and the resonance chamber rapidly dropping in pressure as work is done in driving the piston and energy is lost in friction and other losses.

The piston is driven in an automatic hydraulic jack like fashion. The upstream drive pressure is shot down the downstream drive pipe and slams into the piston. The impulse impact causes the piston to be driven upward while low pressure at the upstream end of the drive pipes, causes liquid to be drawn into the pipes from the liquid source through the open 1-inch control valve at the liquid source. Any time the reaction tries to reverse, the upstream 1-inch control valve slams shut stopping any backward flow just as in any simple hydraulic jack operation, but very rapidly so that high pressure transient waves are reflected back down the pipe to drive the piston. The 1-inch control valve thus opens during low pressure waves to admit liquid into the pipes and then slams shut to stop and reflect high transient pressure waves back down the pipe to drive the piston.

The 6-inch piston is initially in position sufficiently close to the face of the sudden cylinder enlargement at the 3-inch tee into the 6-inch cylinder so that no appreciable pressure loss results from the sudden enlargement. So, the first impact of the initial 400 psi pressure wave doubles as it slams into the piston cylinder and exerts over 22,600 lbs of thrust against the piston. That initial thrust begins the driving of the piston. Meanwhile rapid back and forth pressure wave cycles occur in the resonance chamber as the pressure begins to be relieved causing very rapidly repeated and increased pressure waves to be transmitted into the downstream drive pipe to drive the piston. The upstream drive pipe provides the liquid needed into the resonance chamber and adds to the driving pressure forces exiting the resonance chamber toward the piston as high transient pressure waves travel up and down the upstream drive pipe.

As the piston is driven, all pressures begin to drop until the pressure waves become sufficiently dissipated to no longer be able to drive the piston. At that point, the waste valve is opened. The remaining pressures that cannot drive the piston cause the liquid to be expelled from the cylinder, through the waste valve, through the downstream heat exchanger and back to the liquid source.

As the liquid is expelled from the cylinder, the direction of the piston reverses and the piston is returned to its initial position ready to be driven again in the next transient pressure work cycle. All valves are then closed and the cycle is repeated.

The energy used to operate the pressure drive part of the cycle includes the energy required to operate the three valves, the upstream 1-inch control valve at the source reservoir, the 3-inch control valve between the upstream and downstream portions of the drive pipe, and the 3-inch waste valve. Those valves can be operated using less than 150 watts of energy. Because the remaining unused pressure not able to drive the piston is available and used to cause the liquid flow from the cylinder through the waste valve, through the heat exchanger, and back into the liquid source, no other energy input is required for accomplishing this return flow.

The net result is that it has been shown that more than enough work can be done to produce 18 KW or 13,275 ft-lbs of work-load energy from each transient pressure cycle each second. In fact, in this design, it has been shown that there is much more than enough repeated transient pressure energy available for the work process than is actually needed to drive the 18 KW load on the piston. Whatever, work is not done by the transient pressures is immediately converted back to internal energy the moment the transient pressures are relieved. So, there is actually no excess work done, but only that required to drive the 18 KW load on the piston and to return the liquid through the heat exchanger back to the liquid source.

Thus, the energy entering and exiting the pressure drive device naturally balances with the amount of work extracted from the transient pressure drive process being equal to the drop in internal energy and temperature in the liquid as it is expelled from the drive cylinder through the waste valve.

It takes comparatively little energy to cause the flow through the heat exchanger and the return of the liquid to the source, so the energy deficit in the liquid, or reduction in overall energy as the liquid flows into the heat exchanger, is essentially 18 KW. That energy deficit has caused the liquid to cool by 1.9 degrees Fahrenheit (1.0 degree Celsius). The heat exchanger adds 18 KW of energy back into the liquid by heating the liquid back up to its original temperature of 70 degrees Fahrenheit. That heating is accomplished from 70 degree air energy blown through the heat exchanger.

The example heat exchanger discussed above is designed for that purpose. That heat exchanger is actually a little larger than required to accomplish 18 KW of heat transfer from 70 degree Fahrenheit air. So, with the exception of the small amount of energy required for the air fan that is needed to blow air through the heat exchanger at 4.3 feet per sec or 3 miles per hour, the energy balance nearly completes with the heat exchanger transferring 18 KW of heat energy back into the liquid. That heat transfer restores the internal molecular kinetic energy of the liquid to its original state so that the liquid can be returned to the source and continuously reused in subsequent transient pressure cycles.

To finish the energy balance, the energy required to operate the 1-inch control valve, the two 3-inch control valves, the ½-inch pressurization valve, the air fan on the heat exchanger and the pressurization pump is supplied from the 18 KW generator driven by the transient pressure drive piston and rod assembly. As discussed above, that energy is less than 1.25 KW (about 770 W for the pressurization and less than 480 W for the three valves and air fan). The energy available for use outside of the system use is thus about 16.75 KW from this transient pressure work process.

In some embodiments, the systems and processes described herein can therefore be substantially closed systems, operated without production of any waste stream or pollution, having no carbon dioxide or other gaseous emissions, and no liquid, particulate, or other solid emissions, although one environmental effect may be temporary cooling of whatever substance is used as the heat source for reheating the circulating liquid. But, even then the net effect on the overall environment impact standpoint can be zero or substantially near zero in some embodiments, due at least in part to the fact that the energy extracted eventually results in a return to the overall environment through heat and friction or other mechanisms. Further, temporary cooling does not even occur if sources with large amounts of available heat energy are used such as the atmospheric air, the earth, or ocean water. Thus, outside of the immediate local effect of the cooled heat source that may be caused by large power systems, which can be easily remedied with proper design, the systems and processes of the present disclosure can have essentially no negative effect on the environment.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A transient liquid pressure power generation system, comprising:
a liquid source;
a transient pressure drive device fluidly coupled to the liquid source to receive liquid from the liquid source, the transient pressure drive device comprising a drive component configured to do work external to the system, a transient wave producing element, and a liquid conduit fluidly coupled to the liquid source, wherein the drive component is located upstream of the transient wave producing element, the transient wave producing element is operable to cause a high pressure transient wave in the liquid traveling through the liquid conduit toward the liquid source to operate the drive component to do work external to the system, and the liquid conduit comprises a first transition surface between a first cross-sectional area and a second cross-sectional area operable to reflect at least a portion of a transient pressure wave in the liquid traveling through the liquid conduit; and a heat source fluidly coupled to the transient pressure drive device and the liquid source to receive liquid from the transient pressure drive device and heat liquid returning to the liquid source, wherein the heat source utilizes energy from a source external to the system to heat the liquid.

2. The system of claim 1, wherein liquid is gravity fed to the transient pressure drive device from the liquid source.

3. The system of claim 1, further comprising a pump to deliver liquid to the transient pressure drive device.

4. The system of claim 1, wherein the drive component comprises a ram piston.

5. The system of claim 1, wherein the drive component comprises a ram turbine.

6. The system of claim 1, wherein the transient wave producing element comprises a valve or a piston to cause the high pressure transient wave.

7. The system of claim 1, wherein the high pressure transient wave travels through the liquid conduit toward the liquid source and returns to do work on the drive component.

8. The system of claim 7, wherein the transient wave producing element is disposed in the liquid conduit.

9. The system of claim 8, wherein the transient wave producing element is disposed in the conduit proximate the liquid source to reflect pressure to the drive component.

10. The system of claim 8, wherein the transient wave producing element is disposed in the conduit proximate the drive component.

11. The system of claim 1, wherein the transition surface is configured to reflect the transient pressure wave in a direction of fluid flow from the liquid source.

12. The system of claim 1, wherein the transition surface is configured to reflect the transient pressure wave in a direction opposite of fluid flow from the liquid source and facilitate transmission of a higher transient pressure wave past the transition surface in a direction of fluid flow from the liquid source.

13. The system of claim 1, wherein the liquid conduit comprises a second transition surface between the second cross-sectional area and a third cross-sectional area operable to reflect at least a portion of the transient pressure wave toward the first transition surface.

14. The system of claim 7, wherein the transient pressure drive device comprises a fluid chamber in the liquid conduit, the fluid chamber containing a compressible fluid to absorb and reflect at least a portion of a transient pressure wave in the liquid traveling through the liquid conduit.

15. The system of claim 14, wherein the fluid chamber is disposed in the liquid conduit proximate the liquid source.

16. The system of claim 14, wherein the fluid chamber is disposed in the liquid conduit proximate the drive component.

17. The system of claim 14, wherein the drive component comprises the fluid chamber.

18. The system of claim 7, wherein the transient pressure drive device further comprises a bypass line and a bypass valve associated with the bypass line, wherein the bypass valve is operable alternately to open to divert liquid from the drive component back to the liquid source and to close to initiate the high pressure transient pressure wave in the liquid.

19. The system of claim 1, wherein the transient pressure drive device is configured to progressively reduce a load on the drive component.

20. The system of claim 1, further comprising a pressure chamber to deliver liquid to the transient pressure drive device.

21. The system of claim 20, further comprising a pressurized air cylinder, and a piston and rod assembly operable with the pressure chamber to facilitate entry of liquid to the pressure chamber from the liquid source and to interact with a transient pressure wave in the liquid.

22. The system of claim 1, wherein the heat source comprises a heat exchanger.

23. The system of claim 1, wherein the heat source comprises a heater.

* * * * *